(12) United States Patent
Onuki

(10) Patent No.: US 12,074,305 B2
(45) Date of Patent: Aug. 27, 2024

(54) TEMPERATURE RAISING DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 17/355,219

(22) Filed: Jun. 23, 2021

(65) Prior Publication Data

US 2022/0021045 A1    Jan. 20, 2022

(30) Foreign Application Priority Data

Jul. 17, 2020  (JP) .................................. 2020-122897

(51) Int. Cl.
| | |
|---|---|
| *H01M 10/657* | (2014.01) |
| *H01M 10/615* | (2014.01) |
| *B60R 16/033* | (2006.01) |

(52) U.S. Cl.
CPC ....... *H01M 10/657* (2015.04); *H01M 10/615* (2015.04); *B60R 16/033* (2013.01); *H01M 2220/20* (2013.01)

(58) Field of Classification Search
CPC ... B60R 16/033; G05D 23/20; H01M 10/615; H01M 10/625; H01M 10/637; H01M 10/657; H01M 2220/20; Y02E 60/10
See application file for complete search history.

(56) References Cited

U.S. PATENT DOCUMENTS

| | | |
|---|---|---|
| 2009/0134851 A1 | 5/2009 | Takeda et al. |
| 2012/0021263 A1 | 1/2012 | Nishi et al. |
| 2012/0112695 A1 | 5/2012 | Nishi et al. |
| 2012/0153877 A1 | 6/2012 | Baba et al. |

(Continued)

FOREIGN PATENT DOCUMENTS

| | | |
|---|---|---|
| CN | 101297458 | 10/2008 |
| CN | 102473976 | 5/2012 |

(Continued)

OTHER PUBLICATIONS

Chinese Office Action for Chinese Patent Application No. 202110650613.X dated Dec. 8, 2023.

(Continued)

*Primary Examiner* — Scott J. Chmielecki
(74) *Attorney, Agent, or Firm* — Amin, Turocy & Watson, LLP

(57) ABSTRACT

The present invention includes an AC generation circuit which is configured to be connected to a secondary battery having characteristics in which a resistance component of an impedance of the secondary battery decreases as a frequency of an alternating current flowing in the secondary battery rises from a low frequency and the resistance component increases as the frequency moves to a high frequency side from a frequency at which the resistance component is minimized and to raise the temperature of the secondary battery by circulating an alternating current at a frequency in a high frequency band higher than the frequency at which the resistance component is minimized in the secondary battery.

5 Claims, 24 Drawing Sheets

(56) References Cited

U.S. PATENT DOCUMENTS

| | | | | |
|---|---|---|---|---|
| 2013/0033232 | A1* | 2/2013 | Kosugi | H01M 10/637 |
| | | | | 320/128 |
| 2014/0015450 | A1* | 1/2014 | Momcilovich | B60L 7/14 |
| | | | | 318/139 |
| 2014/0076875 | A1* | 3/2014 | Gale | B60L 58/27 |
| | | | | 219/202 |
| 2014/0329113 | A1* | 11/2014 | Han | H01M 10/4264 |
| | | | | 429/7 |
| 2020/0144684 | A1 | 5/2020 | Takamatsu | |
| 2020/0212520 | A1* | 7/2020 | Dan | H01M 10/48 |
| 2021/0245628 | A1* | 8/2021 | Zuo | H01M 10/63 |
| 2021/0351732 | A1* | 11/2021 | Shen | H01M 10/637 |
| 2022/0077518 | A1* | 3/2022 | Ling | H01M 10/613 |
| 2022/0080858 | A1* | 3/2022 | Lian | B60L 58/27 |
| 2022/0247015 | A1* | 8/2022 | Du | H01M 10/6571 |

FOREIGN PATENT DOCUMENTS

| | | | | |
|---|---|---|---|---|
| CN | 102545317 | 7/2012 | | |
| CN | 102916233 | 2/2013 | | |
| CN | 103213543 | 7/2013 | | |
| CN | 103419656 | 12/2013 | | |
| CN | 207459113 | 6/2018 | | |
| CN | 109130816 | 1/2019 | | |
| CN | 209479443 | 10/2019 | | |
| CN | 210326036 | 4/2020 | | |
| CN | 111137172 | 5/2020 | | |
| CN | 111293381 | 6/2020 | | |
| JP | 2003-274565 | 9/2003 | | |
| JP | 2011-018533 | 1/2011 | | |
| JP | 2013-037859 | 2/2013 | | |
| JP | 5293820 | 9/2013 | | |
| JP | 2019-129555 | 8/2019 | | |
| WO | 2011/004464 | 1/2011 | | |
| WO | WO-2011004247 A2 * | 1/2011 | | B60L 11/1872 |
| WO | 2012/010288 | 1/2012 | | |
| WO | 2020/072441 | 4/2020 | | |

OTHER PUBLICATIONS

Japanese Office Action for Japanese Patent Application No. 2020-122897 dated Jan. 30, 2024.

Japanese Notice of Allowance for Japanese Patent Application No. 2020-122897 mailed Jun. 11, 2024.

* cited by examiner

TEMPERATURE RAISING DEVICE

CROSS-REFERENCE TO RELATED APPLICATION

Priority is claimed on Japanese Patent Application No. 2020-122897, filed Jul. 17, 2020, the content of which is incorporated herein by reference.

Field

The present invention relates to a temperature raising device.

Description of Related Art

In the related art, a device, which raises the temperature of a secondary battery by causing the secondary battery to actively generate a ripple current at a frequency in a frequency domain in which an absolute value of an impedance relatively decreases on the basis of frequency characteristics of the impedance of the secondary battery, is disclosed (Japanese Patent No. 5293820).

SUMMARY

However, in the technology of the related art described above, there have been cases in which the temperature of a secondary battery cannot be efficiently raised.

The present invention has been made in consideration of such circumstances, and an object thereof is to provide a temperature raising device capable of more efficiently raising the temperature of a secondary battery.

Solution to Problem

A temperature raising device according to this invention employs the following constitution.

(1): A temperature raising device according to an aspect of the invention includes an AC generation circuit which is configured to be connected to both ends of a secondary battery having characteristics in which a resistance component of an impedance of the secondary battery decreases as a frequency of an alternating current flowing in the secondary battery rises from a low frequency and the resistance component increases as the frequency moves to a high frequency side from a frequency at which the resistance component is minimized and to raise the temperature of the secondary battery by circulating an alternating current at a frequency in a high frequency band higher than the frequency at which the resistance component is minimized in the secondary battery.

(2): A temperature raising device according to another aspect of this invention includes an AC generation circuit which is configured to be connected to both ends of a secondary battery and to internally have a capacitor element. The AC generation circuit raises the temperature of the secondary battery by circulating an alternating current, which is amplified by resonating an inductance element of the secondary battery and the capacitor element with each other in a high frequency band higher than a frequency at which a resistance component of an impedance of the secondary battery is minimized, in the secondary battery.

(3): In the aspect (1) or (2) described above, the frequency of the alternating current is a frequency lower than a frequency of which a wavelength becomes equivalent to four times a wavelength of a conducting path length of an alternating current supplied to the secondary battery.

(4): In any one of the aspects (1) to (3) described above, the frequency of the alternating current is one at which degree of electrochemical reaction of the secondary battery is lower than a predetermined degree.

(5): A temperature raising device according to another aspect of this invention includes an AC generation circuit that includes a first circuit, a second circuit, and a third circuit, the first circuit having a first capacitor and a first switch connected to each other in series, the second circuit having a second switch and a second capacitor connected to each other in series, and a third circuit including a third switch provided in a circuit connected to a contact point provided between the first capacitor and the first switch and a contact point provided between the second capacitor and the second switch, the second circuit being connected to the first circuit in parallel, wherein the AC generation circuit is configured to execute a first control for supplying electricity from the first capacitor and the second capacitor to a secondary battery connected to the first circuit and the second circuit in a state in which the first switch and the second switch are in a shut-off state, the third switch is in a conduction state and the first capacitor and the second capacitor are connected to each other in series, and wherein the AC generation circuit is configured to execute a second control for supplying electricity from the secondary battery to the first capacitor and the second capacitor in a state in which the first switch and the second switch are in a conduction state and the third switch is in a shut-off state.

(6): In the aspect (5) described above, a switching frequency at which the first control and the second control are switched is a frequency between a resonance frequency of a series circuit and a resonance frequency of a parallel circuit. The series circuit being formed when the first switch and the second switch are in a shut-off state and the third switch is in a conduction state. The parallel circuit being formed when the first switch and the second switch are in a conduction state and the third switch is in a shut-off state. The series circuit is a circuit in which the secondary battery, the first capacitor, the third switch, and the second capacitor are connected to each other in series. The parallel circuit is a circuit in which the secondary battery, a circuit having the first capacitor and the first switch connected to each other in series, and a circuit having the second capacitor and the second switch connected to each other in series are connected to each other in parallel.

(7): In the aspect (5) or (6) described above, the temperature raising device is configured to be operated at a switching frequency and a switching duty in which a period of the first control is half a resonance cycle or an odd multiple of the half a resonance cycle of a series circuit formed when the first switch and the second switch are in a shut-off state and the third switch is in a conduction state and a period of the second control is half a resonance cycle an odd multiple of the half a resonance cycle time of a parallel circuit formed when the first switch and the second switch are in a conduction state and the third switch is in a shut-off state. The series circuit is a circuit in which the secondary battery, the first capacitor, the third switch, and the second capacitor are connected to each other in series. The parallel circuit is a circuit in which the secondary battery, a circuit having the first capacitor and the first switch connected to each other in series, and a circuit having the second capacitor and the second switch connected to each other in series are connected to each other in parallel.

(8): In any one of the aspects (5) to (7) described above, the temperature raising device is configured to be operated at a switching frequency and a switching duty while shifting from a state of the first control to the second control when a current flowing in the first capacitor and the second capacitor straddles zero due to resonance of a series circuit and shifting from a state of the second control to the first control when a current flowing in the first capacitor and the second capacitor straddles zero due to resonance of a parallel circuit, the series circuit being formed when the first switch and the second switch are in a shut-off state and the third switch is in a conduction state, the parallel circuit being formed when the first switch and the second switch are in a conduction state and the third switch is in a shut-off state, wherein the series circuit is a circuit in which the secondary battery, the first capacitor, the third switch, and the second capacitor are connected to each other in series, and wherein the parallel circuit is a circuit in which the secondary battery, a circuit having the first capacitor and the first switch connected to each other in series, and a circuit having the second capacitor and the second switch connected to each other in series are connected to each other in parallel.

(9): In the aspect (5) described above, a heat generation quantity of the secondary battery and a heat generation loss quantity of the AC generation circuit are regulated by adjusting a switching frequency at which the first control and the second control are switched between and a switching duty.

Advantageous Effects of Invention

According to (1) to (9) described above, the temperature of a secondary battery can be more efficiently raised.

DETAILED DESCRIPTION

Hereinafter, with reference to the drawings, embodiments of a temperature raising device of the present invention will be described.

In the following description, a temperature raising device will be described such that it raises the temperature of a secondary battery mounted in a vehicle. However, in place of (or in addition to) this, it may be applied to a primary battery, a capacitor, a fuel cell, or other devices and equipment in which these are mounted.

First Embodiment

[Entire Constitution]

Figure 1:
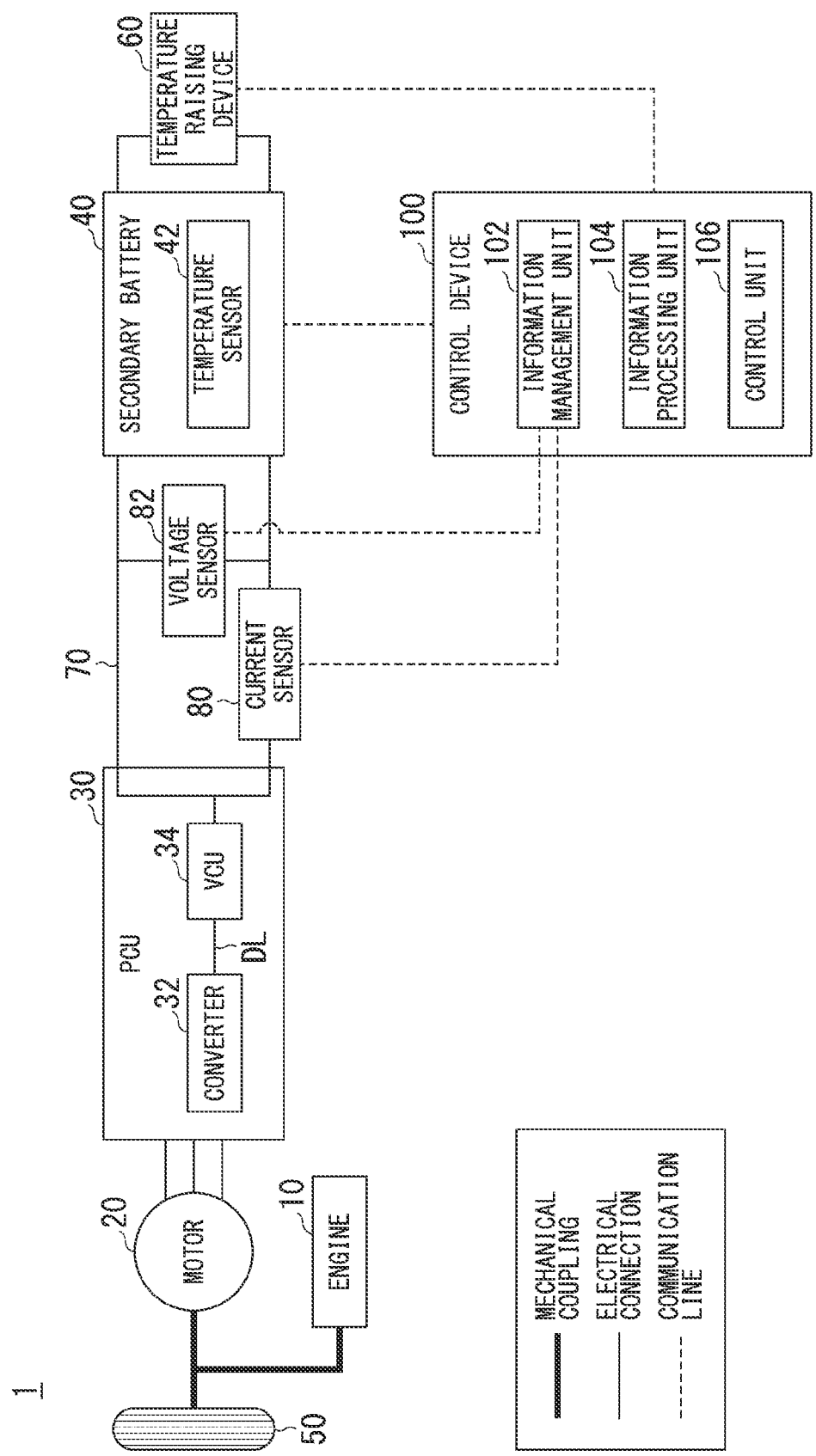
FIG. 1 is a view showing an example of a constitution of an electrically driven vehicle in which an electricity storage system including a temperature raising device is mounted.

FIG. 1 is a view showing an example of a constitution of an electrically driven vehicle in which an electricity storage system 1 including a temperature raising device is mounted. For example, an electrically driven vehicle in which the electricity storage system 1 is mounted is a vehicle having two wheels, three wheels, four wheels, or the like, and a driving source thereof is an electric motor or a combination of an electric motor and an internal-combustion engine such as a diesel engine or a gasoline engine. An electric motor is operated using discharged electricity of a secondary battery. In the following description, as an example, an electrically driven vehicle will be described such that it is a hybrid vehicle having an engine or an electric motor as a driving source.

As shown in FIG. 1, for example, in the electricity storage system 1, an engine 10, a motor 20, a power control unit (PCU) 30, a secondary battery 40, a driving wheel 50, a temperature raising device 60, a current sensor 80, a voltage sensor 82, a control device 100, and the like are mounted.

The engine 10 is an internal-combustion engine outputting motive power by combusting fuel such as gasoline. For example, the engine 10 is a reciprocating engine including cylinders, pistons, intake valves, exhaust valves, a fuel injection device, ignition plugs, connecting rods, a crankshaft, and the like. The engine 10 may be a rotary engine.

For example, the motor 20 is a three-phase AC generator. For example, the motor 20 is an electric motor for traveling. The motor 20 outputs motive power to the driving wheel 50 using supplied electricity. The motor 20 generates electricity using kinetic energy of the vehicle at the time of deceleration of the vehicle. The motor 20 performs driving and regeneration of the vehicle. Regeneration is operation of the motor 20 generating electricity. The motor 20 may include an electric motor for generating electricity. For example, an electric motor for generating electricity generates electricity using motive power output by the engine 10.

For example, the PCU 30 includes a converter 32 and a voltage control unit (VCU) 34. A constitution in which these constituent elements are united as the PCU 30 is only an example, and these constituent elements may be disposed in a dispersed manner.

For example, the converter 32 is an AC-DC converter. A DC-side terminal of the converter 32 is connected to the VCU 34 via a DC link DL. The converter 32 converts an alternating current generated by the motor 20 to a direct current and outputs the converted current to the DC link DL or converts a direct current supplied via the DC link DL to an alternating current and supplies the converted current to the motor 20.

For example, the VCU 34 is a DC-DC converter. The VCU 34 boosts electricity supplied from the secondary battery 40 and outputs the boosted electricity to the converter 32.

For example, the secondary battery 40 is a battery such as a lithium-ion battery which can be repetitively charged or discharged. The secondary battery 40 is linked to the PCU 30 through an electric power line 70. For example, the secondary battery 40 includes a plurality of battery blocks, and these battery blocks are electrically connected to each other in series. Each of positive terminals and each of negative terminals of the battery blocks are connected to the PCU 30. The secondary battery 40 may include a DC-AC converter, a DC-DC converter, or the like (not shown).

The secondary battery 40 (or a casing accommodating the secondary battery 40) is provided with a temperature sensor 42 detecting the temperature of the secondary battery 40 or a current sensor detecting a current output by the secondary battery 40.

The temperature raising device 60 raises the temperature of the lithium-ion battery. Details of the temperature raising device 60 will be described below.

The current sensor 80 is attached to the electric power line 70. The current sensor 80 detects a current at a predetermined measurement point in the electric power line 70. The voltage sensor 82 detects a voltage between terminals of the secondary battery 40. For example, the voltage sensor 82 includes a plurality of voltage sensors, and these voltage sensors may detect a voltage between terminals of different battery blocks.

[Functional Constitution of Control Device]

For example, the control device 100 includes an information management unit 102, an information processing unit 104, and a control unit 106. The information management unit 102, the information processing unit 104, and the control unit 106 are realized by a hardware processor such as a central processing unit (CPU) executing a program (software) stored in a storage device (not shown). In addition, some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware or a hardware processor in cooperation. For example, the storage device is realized by a nonvolatile storage device such as a read only memory (ROM), an electrically erasable and programmable read only memory (EEPROM), or a hard disk drive (HDD), and a volatile storage device such as a random access memory (RAM) or a register.

The information management unit 102 acquires detection results of the current sensor 80, detection results of the voltage sensor 82, a state of the secondary battery 40, detection results of the temperature sensor 42, and the like. The information management unit 102 manages acquired information and processing results of a host device. For example, the information management unit 102 stores the foregoing information in the storage device.

The information processing unit 104 estimates an SOC and estimates other states of the secondary battery 40 on the basis of information acquired by the information management unit 102. Other states include that of an abnormality, an operation state, and the like of the secondary battery 40.

The control unit 106 charges the secondary battery 40 by controlling a charging circuit (not shown) of the secondary battery 40 on the basis of an instruction of the control device 100 or discharges the secondary battery 40 by controlling a discharging circuit (not shown) of the secondary battery 40 or a load connected to the secondary battery 40. The control unit 106 controls the temperature raising device 60 on the basis of the temperature of the secondary battery 40 or the SOC of the secondary battery 40. Details thereof will be described below.

Figure 2:
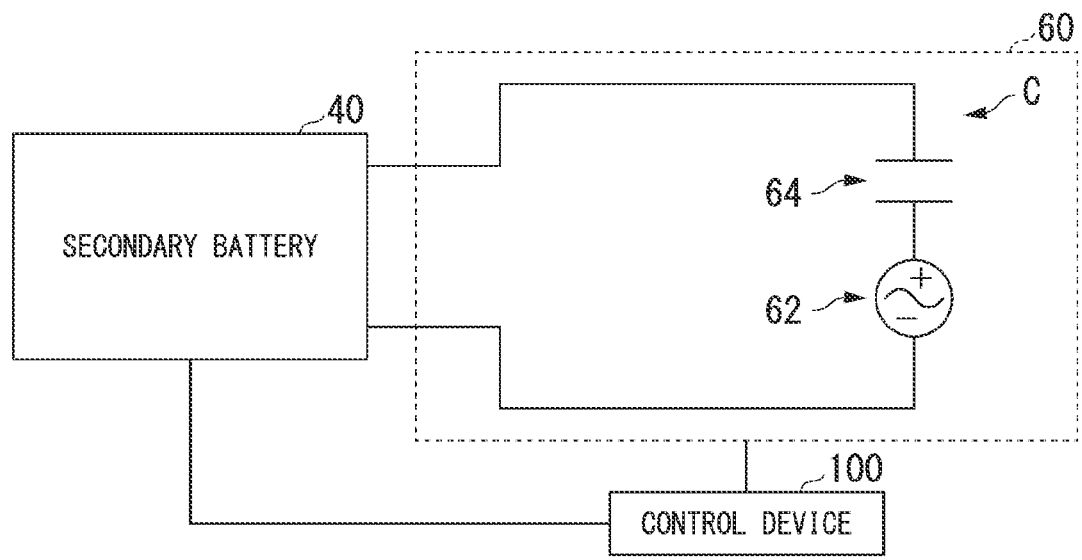
FIG. 2 is a view showing an example of a constitution of the temperature raising device.
Figure 3:
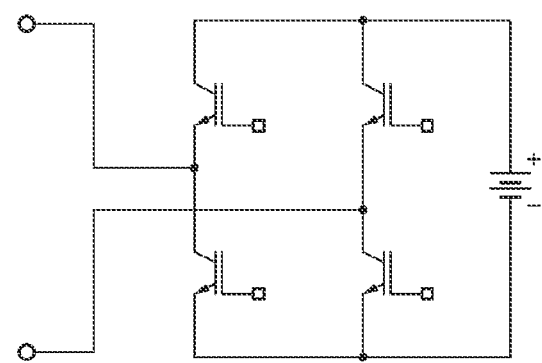
FIG. 3 is a view showing an example of a constitution of an AC power source.

FIG. 2 is a view showing an example of a constitution of the temperature raising device 60. For example, the temperature raising device 60 includes a series circuit C which is connected to both ends of the secondary battery 40 and in which an AC power source 62 and a capacitor 64 are connected to each other in series. The AC power source 62 sets an AC voltage and an alternating current on the basis of control of the control device 100 and circulates the set AC voltage and alternating current in the capacitor 64 and the secondary battery 40. FIG. 3 shows an example of a constitution of the AC power source 62. As shown in FIG. 3, the AC power source 62 includes a circuit in which series circuits having two switching elements provided in series are connected to each other in parallel and these series circuits are connected to a voltage source. An electric power line connected to the capacitor 64 is connected to a portion between two switching elements of one series circuit, and an electric power line connected to the secondary battery 40 is connected to a portion between two switching elements of the other series circuit. The AC power source 62 circulates an alternating current in the capacitor 64 and the secondary battery 40 by controlling the switching elements in which diagonally disposed switching elements are paired.

The circuit including the AC power source 62 in the series circuit C is an example of "an AC generation circuit which is configured to be connected to both ends of a secondary battery having characteristics in which a resistance component of an impedance of the secondary battery decreases as a frequency of an alternating current flowing in the secondary battery rises from a low frequency and the resistance component increases as the frequency moves to a high frequency side from a frequency at which the resistance component is minimized and to raise the temperature of the secondary battery by circulating an alternating current at a frequency in a frequency band higher than the frequency at which the resistance component is minimized in the secondary battery".

The series circuit C is another example of "an AC generation circuit which is configured to be connected to both ends of a secondary battery and to internally have a capacitor element". The AC power source 62 is an example of "an AC power source which raises the temperature of the secondary battery by circulating an alternating current, which has a frequency in a high frequency band higher than a frequency at which a resistance component of an impedance of the secondary battery is minimized, in the secondary battery" or "an AC power source which raises the temperature of the secondary battery by circulating an alternating current, which is amplified by resonating an inductance element of the secondary battery and the capacitor element with each other in a high frequency band higher than a frequency band at which a resistance component of an impedance of the secondary battery is minimized, in the secondary battery".

[Flowchart]

Figure 4:
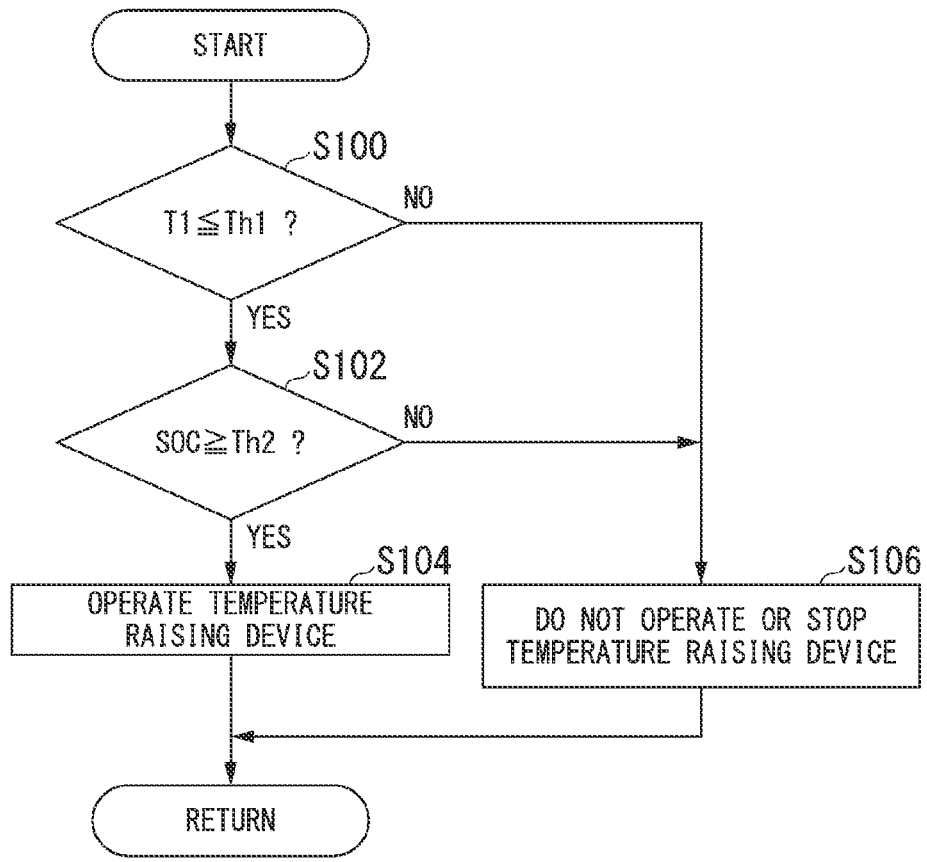
FIG. 4 is a flowchart showing an example of a flow of processing executed by a control unit of a control device.

FIG. 4 is a flowchart showing an example of a flow of processing executed by the control unit 106 of the control device 100. First, the control unit 106 acquires the temperature of the secondary battery 40 from the temperature sensor 42 and determines whether or not an acquired temperature T1 is equal to or lower than a threshold Th1 (Step S100). When the acquired temperature T1 is equal to or lower than the threshold Th1, the control unit 106 acquires the SOC of the secondary battery 40 estimated by the information processing unit 104 and determines whether or not the acquired SOC is equal to or higher than a threshold Th2 (Step S102).

When the acquired SOC is equal to or higher than the threshold Th2, the control unit 106 causes the temperature raising device 60 to operate (Step S104). Causing a device to operate denotes that electricity is supplied to the capacitor 64 and the secondary battery 40. A technique of operating the temperature raising device 60 will be described below.

When the acquired temperature T1 is not equal to or lower than the threshold Th1 or when the acquired SOC is not equal to or higher than the threshold Th2, the control unit 106 does not cause the temperature raising device 60 to operate (Step S106). When the temperature raising device 60 is in operation, the operation is stopped.

As described above, the control unit 106 controls the temperature raising device 60 on the basis of the temperature and the SOC of the secondary battery 40.

[Comparison with Comparative Example]

(Comparative Example)

Figure 5:
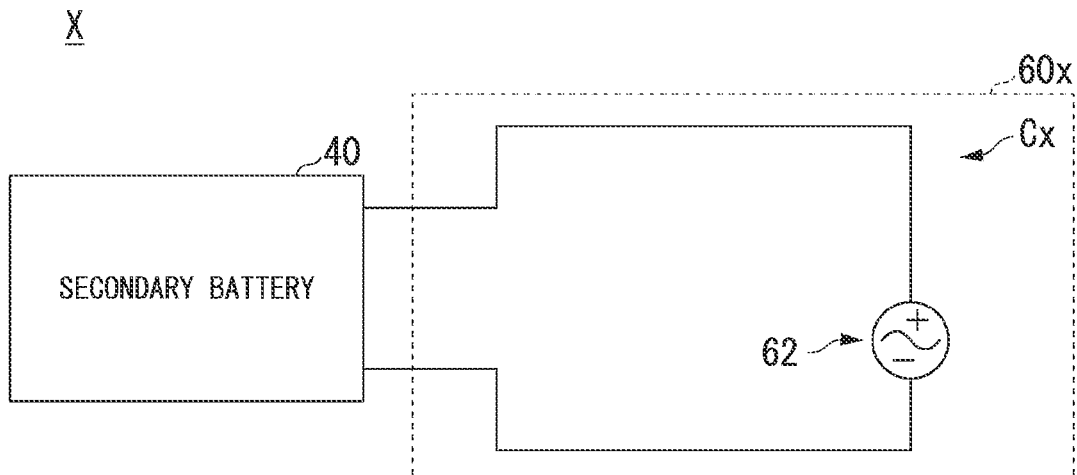
FIG. 5 is a view showing a constitution of a secondary battery 40 and a temperature raising device 60x in a comparative example.

FIG. 5 is a view showing a constitution of the secondary battery 40 and a temperature raising device 60x in a comparative example. In the temperature raising device 60x, a capacitor is omitted. Hereinafter, this constitution will be referred to as "a constitution X (a circuit Cx)". Frequencies and other sizes in FIG. 5 and diagrams which will be described below are merely examples and vary depending on the constitution of the circuit or the size of each element.

Figure 6:
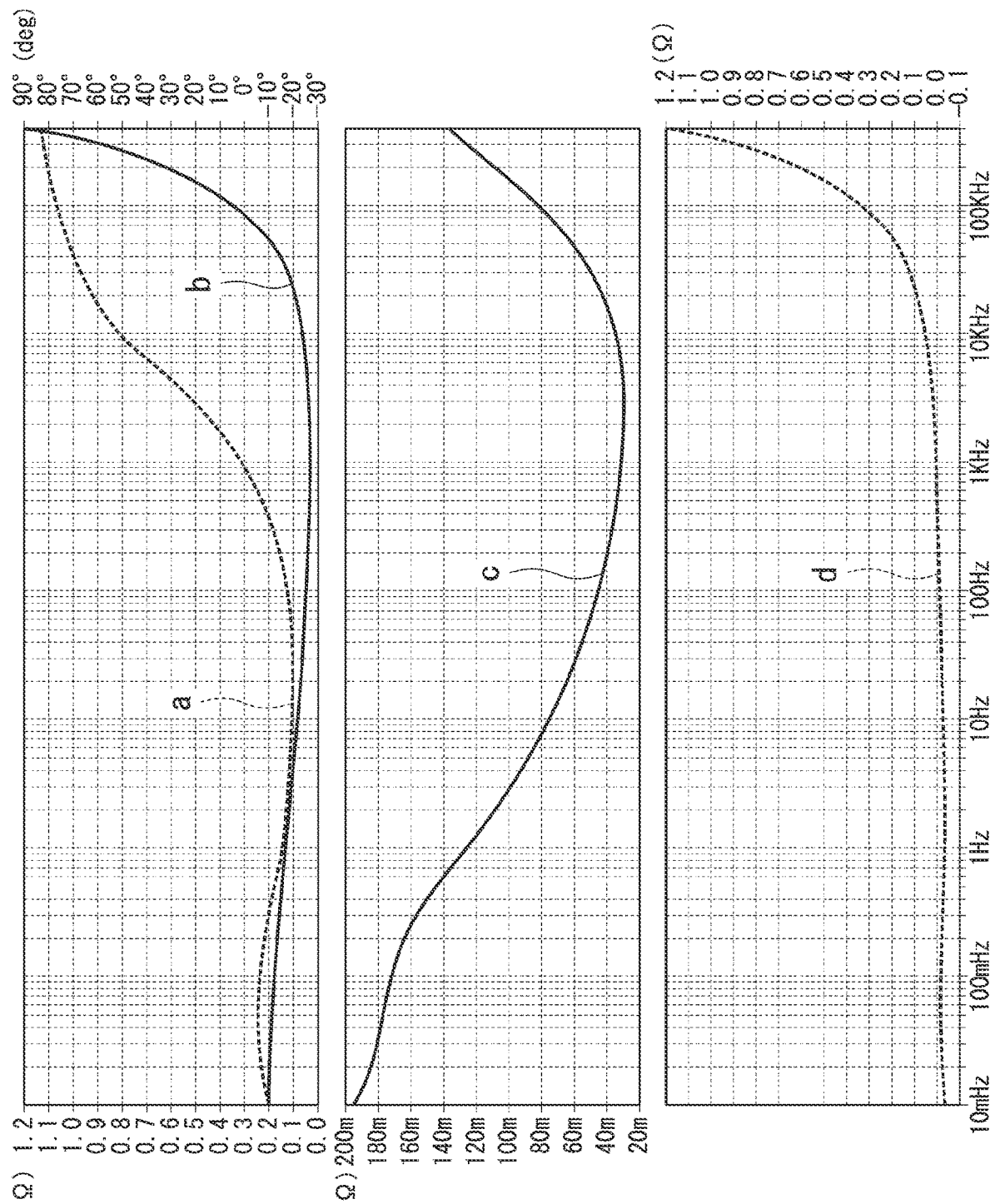
FIG. 6 is a view showing electrical characteristics of a constitution X.

FIG. 6 is a view showing electrical characteristics of the constitution X. The upper diagram, the middle diagram, and the lower diagram of FIG. 6 show electrical characteristics when the AC power source 62 applies a constant voltage (for example, 0.2 [V]) to the constitution X while the frequency is varied. The horizontal axes in the upper diagram, the middle diagram, and the lower diagram of FIG. 6 indicate frequency. The vertical axis on the left side in the upper diagram of FIG. 6 indicates voltage, and the vertical axis on the right side indicates phase angle. FIG. 6 shows characteristics of an absolute value ($\Omega$) "b in the diagram" of the impedance and a phase (deg) "a in the diagram" of the impedance. If a constant voltage is applied to the constitution X while the frequency is varied, a current in the constitution X varies. In other words, as shown in the upper diagram of FIG. 6, the absolute value ($\Omega$) of the impedance varies.

The middle diagram of FIG. 6 shows characteristics of a resistance component ($\Omega$) "c in the diagram" of the impedance in the upper diagram, and the lower diagram of FIG. 6 shows characteristics of a reactance component ($\Omega$) "d in the diagram" of the impedance in the upper diagram.

In the constitution X having such frequency characteristics of an impedance, the resistance component of the impedance has also increased on a high frequency side. Therefore, if an alternating current is applied in a frequency band having a large resistance component, heat generation can be achieved with a lower current.

However, in consideration of the inductance component included in the secondary battery 40, since the reactance component due to the inductance increases in a high frequency band, the absolute value of the impedance increases. In this case, the amplitude of an alternating current cannot be increased unless the amplitude of an AC voltage is increased.

(Constitution of First Embodiment)

In the first embodiment, a high alternating current is obtained at a low AC voltage with a constitution in which a capacitor is added to resonate with the inductance of the secondary battery 40 in a high frequency band. Further, in the first embodiment, a large heat generation quantity can be obtained at a low current through electrification performed by resonating the circuit at a frequency at which the resistance component increases.

Figure 7:
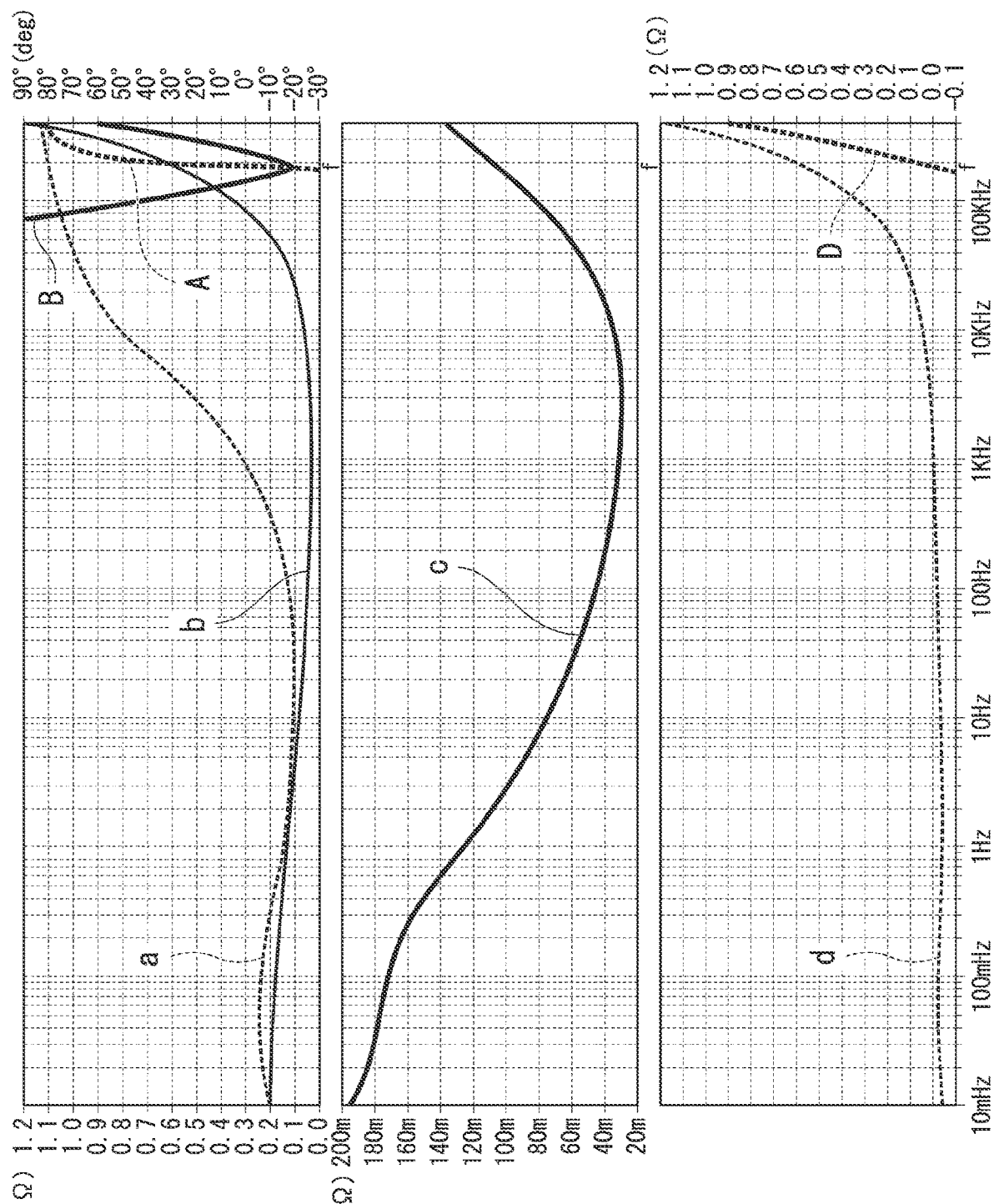
FIG. 7 is a view showing electrical characteristics of a constitution of a first embodiment (a constitution including a secondary battery and the temperature raising device).

FIG. 7 is a view showing electrical characteristics of a constitution of the first embodiment (a constitution including the secondary battery 40 and the temperature raising device 60). FIG. 7 is a graph in which electrical characteristics of the constitution of the first embodiment is applied to FIG. 6. "A" in the diagram indicates the phase (deg) of the impedance, "B" in the diagram indicates the absolute value ($\Omega$) of the impedance, and "D" in the diagram indicates the reactance component ($\Omega$) of the impedance. As shown in the upper diagram of FIG. 7, when the capacitor 64 is added, the reactance component of the impedance becomes close to zero at a resonance point ("f" in the diagram), and the absolute value of the impedance becomes equivalent to the resistance component of the impedance.

Figure 8:
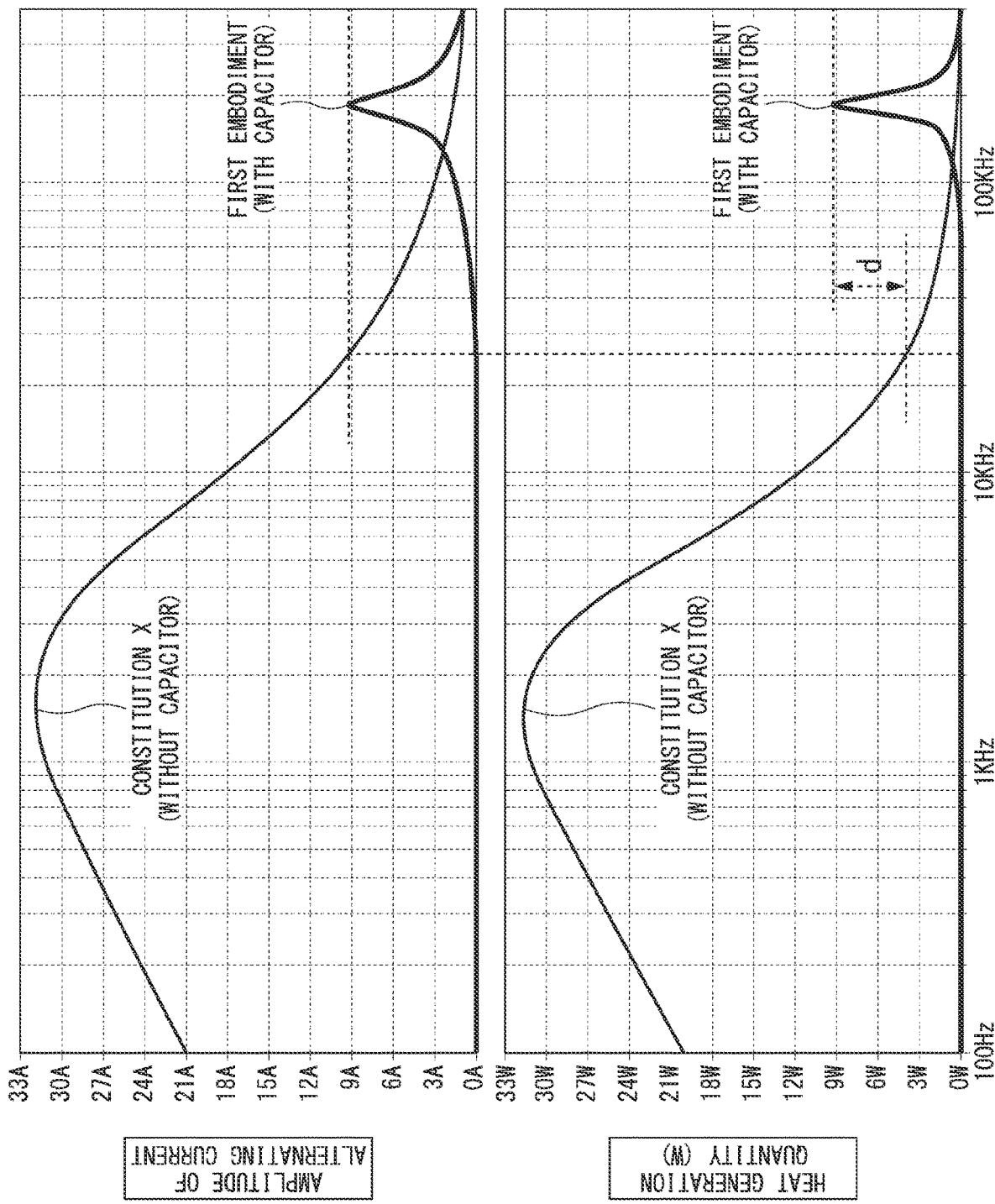
FIG. 8 is a view showing an example of a relationship between amplitudes of currents and heat generation quantities of the constitution X of the comparative example and the constitution of the first embodiment.

FIG. 8 is a view showing an example of a relationship between amplitudes of currents and heat generation quantities of the constitution X of the comparative example and the constitution of the first embodiment. The horizontal axes in the upper diagram and the lower diagram of FIG. 8 indicate frequency. The vertical axis in the upper diagram of FIG. 8 indicates current amplitude, and the vertical axis in the lower diagram of FIG. 8 indicates heat generation quantity [W]. As shown in FIG. 8, the heat generation quantity of the first embodiment corresponding to a predetermined current amplitude is larger than the heat generation quantity of the constitution X corresponding to the predetermined current amplitude by a heat generation quantity d. In this manner, a heat generation quantity larger than that of the constitution X can be obtained in the first embodiment even at the same current amplitude.

As described above, in the first embodiment, a large heat generation quantity can be obtained at a low current when the AC power source 62 supplies electricity such that electrification is performed at the resonance point. As a result, the temperature of the secondary battery can be more efficiently raised.

[Regarding High Frequency Band Higher than Frequency Band at which Resistance Component is Minimized]

In a general structure of secondary batteries such as lithium-ion batteries, foil-shaped conductors are coated with an electrode active material and form multilayers with separators impregnated with an electrolytic solution. Moreover, the conductors are bundled on each of a cathode side and an anode side, form electric collectors, and are respectively connected to a cathode terminal and an anode terminal provided on an exterior body of the battery.

Regarding batteries for electric cars and the like, it is common to form a structure in which a plurality of batteries are bundled in series or in parallel such that they are constituted as a battery module. Terminals of the batteries are connected to each other via a bus bar or a cable inside the battery module. When a high-frequency current is applied to the batteries, the resistance component increases due to a skin effect and a proximity effect as the frequency increases. In a case of general lithium-ion batteries, aluminum foils are used for cathode conductors and copper foils are used for anode conductors, and thicknesses thereof are generally within a range of 10 μm to 30 μm.

Since the frequency having a skin depth of 10 μm is approximately 43 MHz in copper and approximately 71 MHz in aluminum, AC resistance value of the conductor foils increases on a frequency side higher than such a frequency. Due to many foils bundled in the electric collector parts, the entire thickness increases, and the AC resistance value increases from a frequency band lower than the foregoing frequency. Moreover, since the bus bar or the cable inside the battery module has a thickness (diameter) within a range of approximately a few tenths of a millimeter to a few millimeters, the AC resistance values increases from a low frequency band similar to the electric collectors. The frequency having a skin depth of 1 mm is approximately 4.3 kHz in copper and approximately 7.1 kHz in aluminum, and the frequency having a skin depth of 100 μm is approximately 426 kHz in copper and approximately 714 kHz in aluminum.

A conducting path length when an alternating current flows in a secondary battery or a secondary battery module is within a range of substantially a few centimeters to a few tens of centimeters. When the frequency increases and the wavelength and the conducting path length become close to each other, characteristics as a distributed constant circuit are manifested. Therefore, it is difficult to perform stable electrification in a battery or a battery module which is not originally designed for a distributed constant circuit. If a battery is designed for a distributed constant circuit which can stably perform electrification, the structure becomes complicated, and thus the weight and the manufacturing cost increase. Generally, it is said that there is a need to treat a battery considering a distributed constant circuit from a size of $\lambda/4$, and it is conceivable that substantially 1 GHz (wavelength in a vacuum state: $\lambda$=30 cm) is the limit for stable electrification with respect to a battery.

On the basis of the point of view described above, [a high frequency band higher than a frequency band at which the resistance component is minimized] is set for each constitution of the battery module. For example, a high frequency band is a band lower than 1 GHz and is a frequency band such as 40 MHz, 50 MHz, 60 MHz, or 70 MHz corresponding to the constitution of the circuit. Further, the control unit 106 controls the AC power source 62 to supply electricity in a high frequency band to the circuit on the basis of information related to the high frequency band stored in the storage device. For example, the frequency of an alternating current supplied to the circuit when raising the temperature of the secondary battery 40 is "a frequency lower than a frequency of which a wavelength becomes equivalent to four times a wavelength of a conducting path length" or a frequency based on a value obtained as described above.

For example, since the high frequency band described above is a high frequency band in which electrochemical reaction of the secondary battery 40 is extremely reduced (degree of electrochemical reaction of the secondary battery is lower than a predetermined degree), deterioration of the secondary battery 40 is curbed. Since a high frequency band is higher than an audible range, occurrence of noise is curbed.

According to the first embodiment described above, the temperature raising device 60 is provided with a circuit that includes a secondary battery having characteristics in which a resistance component of an impedance of the secondary battery decreases as a frequency of an alternating current flowing in the secondary battery rises from a low frequency and the resistance component changes to increase from a frequency at which the resistance component is minimized, and an AC power source that raise the temperature of the battery by circulating an alternating current at a frequency in a high frequency band higher than the frequency band in which the resistance component is minimized. Therefore, the temperature of a secondary battery can be more efficiently raised.

Second Embodiment

Hereinafter, a second embodiment will be described. In the second embodiment, a temperature raising device has a constitution different from the constitution of the temperature raising device 60 in the first embodiment. Moreover, the secondary battery 40 raises the temperature by repeating charging and discharging. Hereinafter, differences between the second embodiment and the first embodiment will be mainly described.

Figure 9:
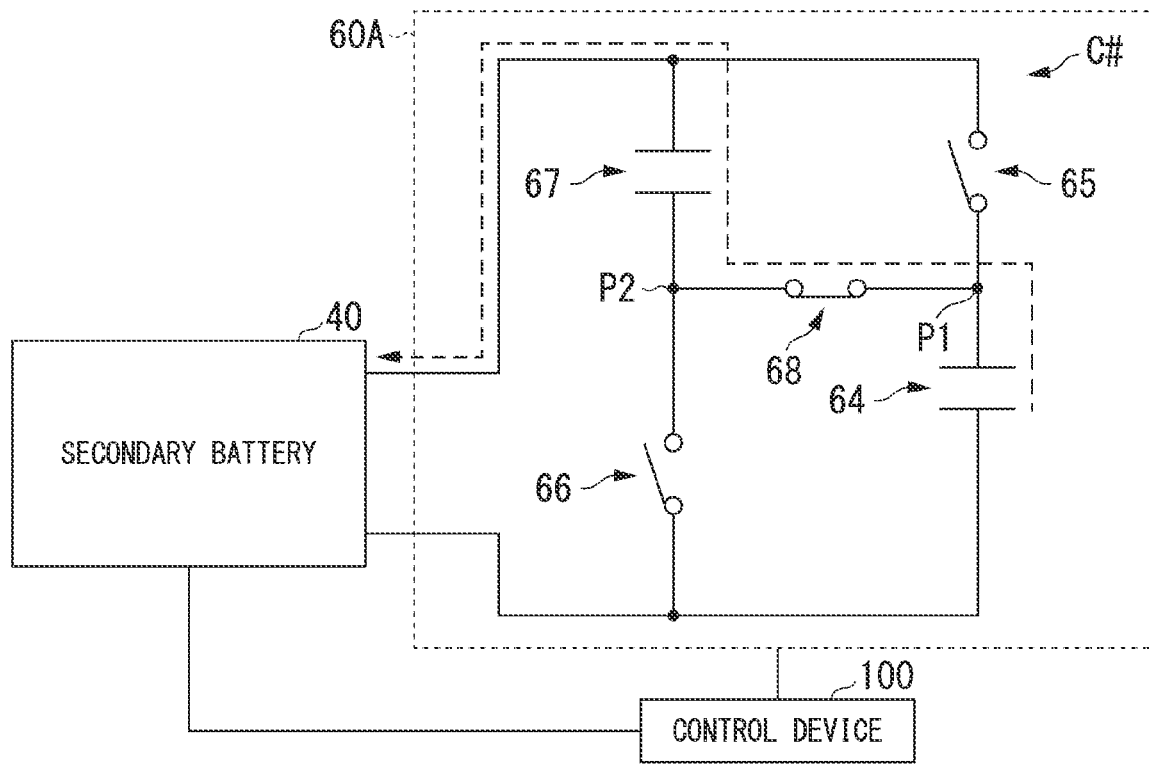
FIG. 9 is a view showing an example of a functional constitution of a temperature raising device of a second embodiment.

FIG. 9 is a view showing an example of a functional constitution of a temperature raising device 60A of the second embodiment. The temperature raising device 60A includes a parallel circuit C#. In the parallel circuit C#, a first circuit and a second circuit are connected to each other in parallel with respect to the secondary battery 40. The first circuit is a circuit in which the capacitor 64 and a switch 65 are connected to each other in series. The second circuit is a circuit in which a switch 66 and a capacitor 67 are connected to each other in series. Moreover, in the parallel circuit C#, a contact point P1 and a contact point P2 are connected to each other, and a switch 68 is connected to a portion therebetween. The contact point P1 is a contact point provided between the capacitor 64 and the switch 65 in the first circuit. The contact point P2 a contact point provided between the switch 66 and the capacitor 67 in the second circuit.

Control at the time of charging will be described. The control unit 106 of the control device 100 controls the switch 68 to be in a conduction state and controls the switch 65 and the switch 66 to be in a shut-off state. When the capacitor 64 and the capacitor 67 connected to each other in series and after the lapse of sufficient time, the voltage of each of the capacitors is set to a voltage which is a divided voltage of the secondary battery 40. When electrostatic capacities of the capacitor 64 and the capacitor 67 are equivalent to each other, the voltage of each of the capacitors is set to a voltage which is half the voltage of the secondary battery 40. When the sum of the voltages of the capacitor 64 and the capacitor 67 before being connected to each other in series is higher than the voltage of the secondary battery 40, the two capacitors are discharged so that the voltages decrease and the secondary battery 40 is charged.

Figure 10:
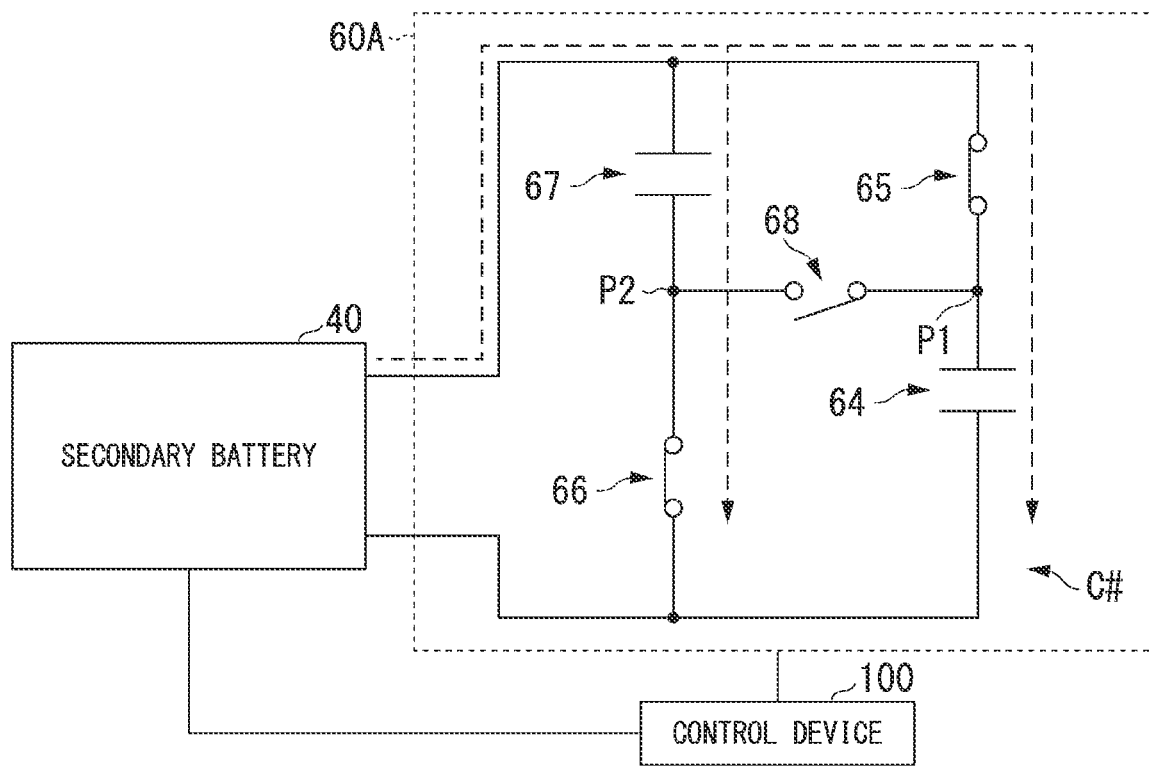
FIG. 10 is a view for describing control performed when the secondary battery is discharged.

FIG. 10 is a view for describing control performed when the secondary battery 40 is discharged. The control unit 106 of the control device 100 controls the switch 65 and the switch 66 to be in a conduction state and controls the switch 68 to be in a shut-off state. When the secondary battery 40, the capacitor 64, and the capacitor 67 are connected to each other in parallel and after the lapse of sufficient time, the voltage of each of the capacitors is set to the voltage of the secondary battery 40. When the voltages of the capacitor 64 and the capacitor 67 before being connected to each other in parallel is lower than the voltage of the secondary battery 40, the two capacitors are charged so that the voltages rise and the secondary battery 40 is discharged.

In this manner, when the two capacitors repeatedly switch between a series state and a parallel state, the secondary battery 40 repeats charging and discharging, and thus it is possible to generate an alternating current reciprocating between the secondary battery 40 and the parallel circuit C#.

In the first embodiment, an independent power source is required to generate an alternating current. However, in the second embodiment, since an alternating current can be generated based on electric charges stored in the secondary battery 40, no independent power source is required.

As described above, at the time of charging and discharging, the control unit 106 switches between charging and discharging at a high speed so as not to damage the secondary battery 40. Moreover, the control unit 106 switches between charging and discharging at a frequency between a resonance frequency in the circuit formed at the time of charging and a resonance frequency in a parallel circuit formed at the time of discharging, thereby supplying a current to the secondary battery 40 or supplying a current from the secondary battery 40 to the capacitor 64 or the like.

A series circuit formed at the time of charging is a circuit including the capacitor 64, the switch 66, the capacitor 67, and the secondary battery 40. A parallel circuit formed at the time of discharging is a circuit including the first circuit and the second circuit which can be regarded as being connected to each other in parallel.

When the inductance component of the secondary battery 40 is Lbatt and the electrostatic capacity of the capacitor 64 and the electrostatic capacity of the capacitor 67 are equivalently Cc0, the resonance frequency of the series circuit formed at the time of charging is expressed by the following Expression (1).

$$f\_res\_s = \frac{\sqrt{2}}{2\pi \times \sqrt{Lbatt \times Cc0}} \quad (1)$$

The resonance frequency of the parallel circuit formed at the time of discharging is expressed by the following Expression (2).

$$f\_res\_p = \frac{1}{2\pi \times \sqrt{Lbatt \times Cc0} \times \sqrt{2}} \quad (2)$$

As expressed by the foregoing Expressions (1) and (2), the resonance frequencies in two states do not coincide with each other, and a relationship of f\_res\_s:f\_res\_p=2:1 is established.

The control unit 106 sets a frequency between the resonance frequency of the series circuit at the time of charging and the resonance frequency of the parallel circuit at the time of discharging to a switching frequency. Further, the control unit 106 switches between charging and discharging on the basis of the switching frequency. The foregoing switching frequency is an example of "a frequency between the resonance frequency of the series circuit formed when the first switch and the second switch are in a shut-off state and the third switch is in a conduction state and the resonance frequency of the parallel circuit formed when the first switch and the second switch are in a conduction state and the third switch is in a shut-off state".

Figure 11:
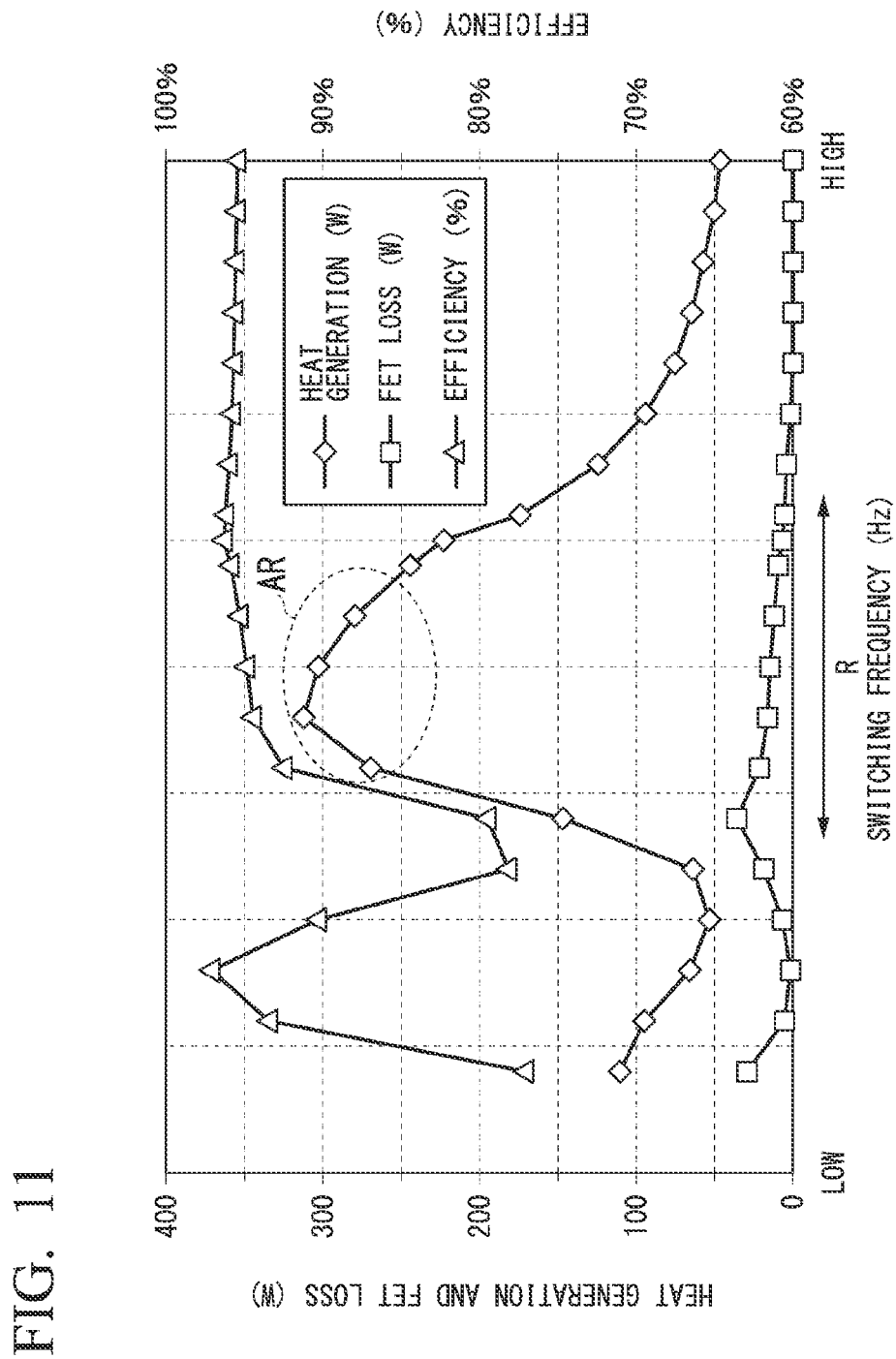
FIG. 11 is a view showing characteristics of a circuit with respect to change in switching frequency.

FIG. 11 is a view showing characteristics of a circuit with respect to change in switching frequency. The horizontal axis in FIG. 11 indicates switching frequency [Hz]. The vertical axis on the left side in FIG. 11 indicates heat generation quantity [W] of the circuit and electricity loss [W] in the switch (FET; field effect transistor), and the vertical axis on the right side in FIG. 11 indicates electricity efficiency [%].

A band of a range R in FIG. 11 is a frequency between the resonance frequency of the series circuit formed at the time of charging and the resonance frequency of the parallel circuit formed at the time of discharging. A heat generation quantity corresponding to a band of this range R becomes larger than a heat generation quantity corresponding to a different frequency as shown in a domain AR. The electricity loss in the FET is also relatively small.

The control device 100 may adjust the heat generation quantity by controlling the frequency. For example, when the heat generation quantity is large, the control device 100 controls the heat generation quantity by adjusting the frequency to a switching frequency such that the heat generation quantity is reduced.

According to the second embodiment described above, the temperature raising device 60A functions as a series circuit at the time of charging and functions as a parallel circuit at the time of discharging. Therefore, the temperature of the secondary battery 40 can be more efficiently raised.

Third Embodiment

Hereinafter, a third embodiment will be described. In the third embodiment, the quantity of an alternating current flowing in the battery, the heat generation quantity in the battery, and a heat generation loss in a device generating an alternating current are adjusted by adjusting a switching frequency and a switching duty. The third embodiment is an embodiment premised upon the idea of the second embodiment. Hereinafter, differences between the third embodiment and the second embodiment will be mainly described.

When an on-time of the switch in a series state is Ts and an on-time of the switch in a parallel state is Tp, a switching frequency fsw is expressed by Expression (3).

$$fsw = \frac{1}{Ts + Tp} \quad (3)$$

A switching duty Dsw is defined as Expression (4).

$$Dsw = \frac{Ts}{Ts + Tp} \quad (4)$$

Figure 12:
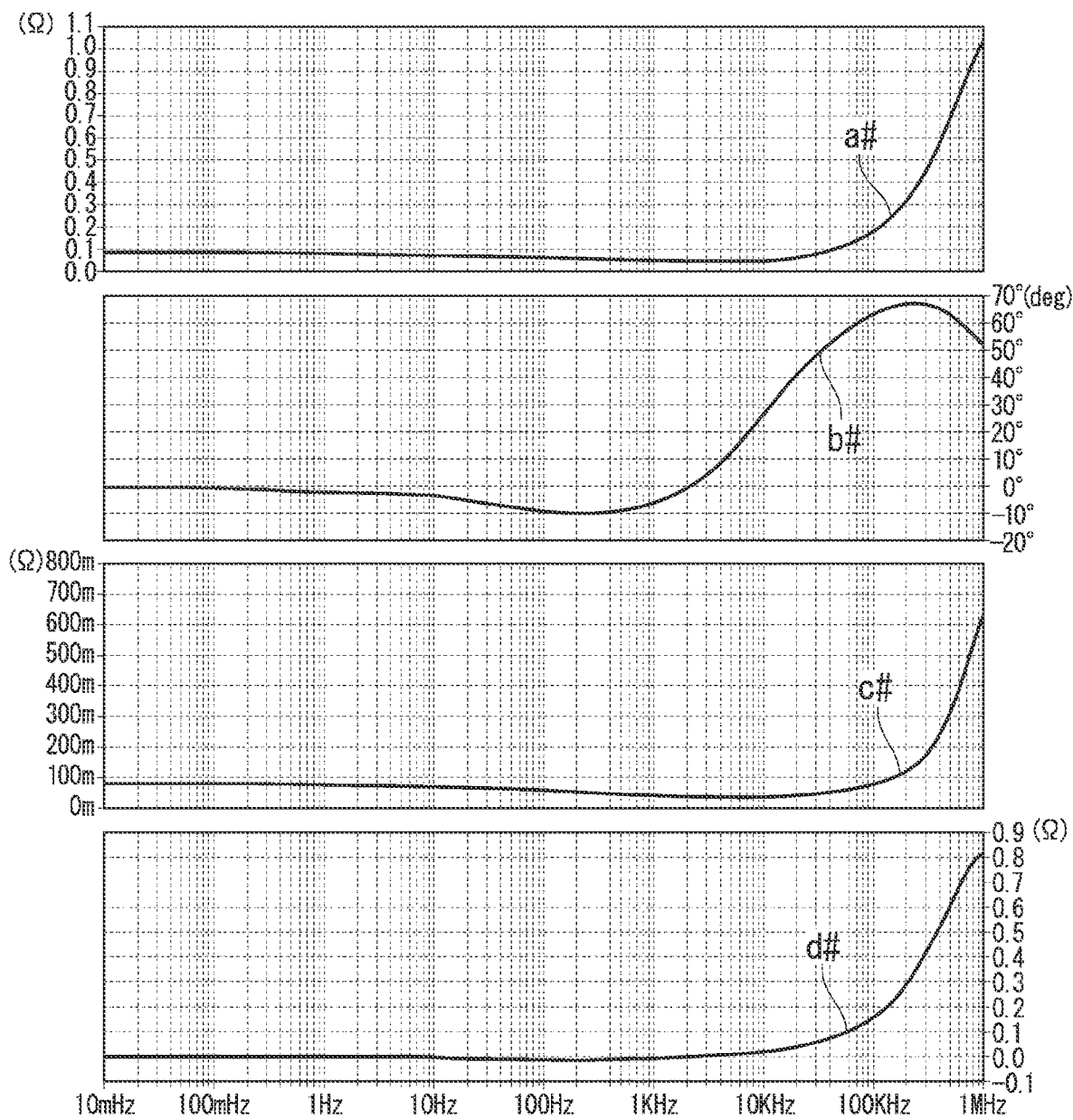
FIG. 12 is a view showing frequency characteristics of an impedance.
Figure 13:
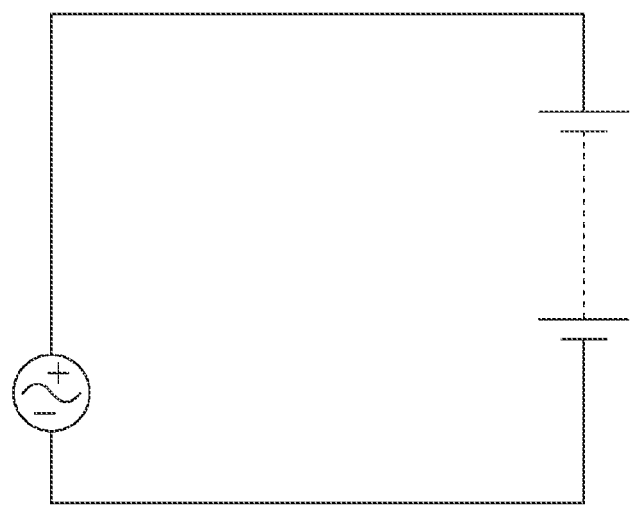
FIG. 13 is a view showing a circuit in which an alternating current source and a sample battery are connected to each other.

A secondary battery having frequency characteristics of an impedance as shown in FIG. 12 will be described as an example. As shown in FIG. 13, the frequency characteristics of an impedance show electrical characteristics when an alternating current source and a sample battery are connected to each other and a sine-wave current having an amplitude 1A is applied from 1 Hz to 1 MHz. In FIG. 12, in order from above, characteristics of the absolute value (1 V=1Ω) of the impedance "a # in the diagram", the phase (deg) of the impedance "b # in the diagram", the resistance component (real number component; 1 V=1Ω) of the impedance "c # in the diagram", and the reactance component (imaginary number component; 1 iV=1Ω) of the impedance "d # in the diagram" are shown. For example, the secondary battery in the third embodiment is a battery different from the secondary battery in the first embodiment.

Figure 14:
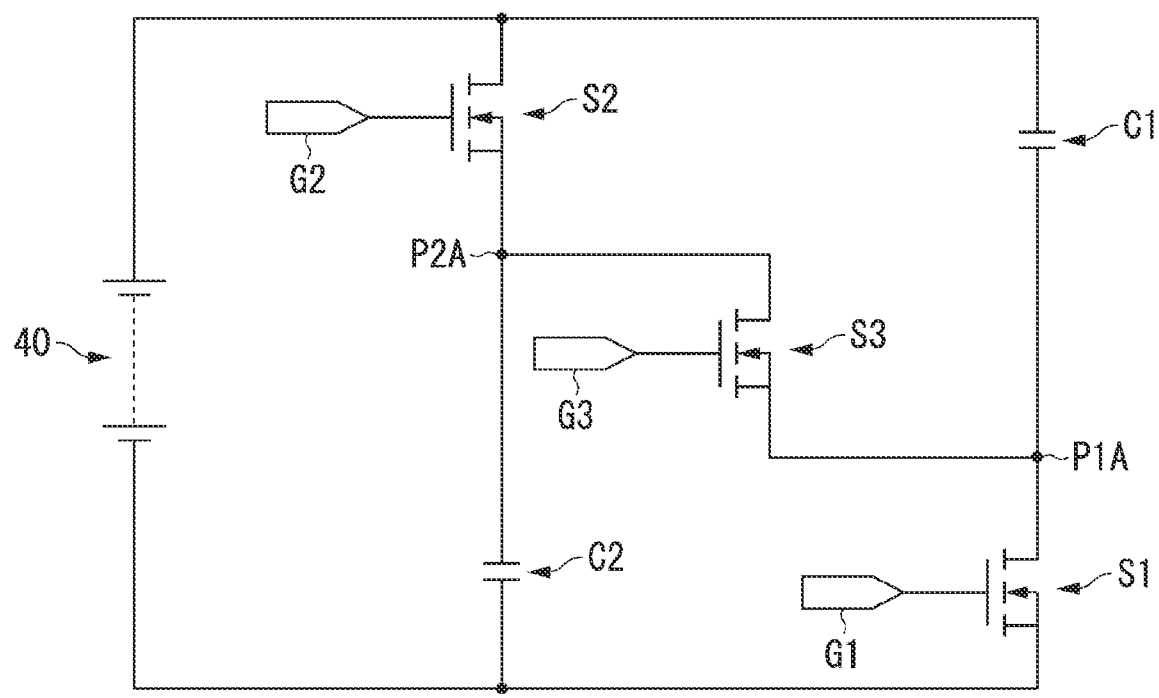
FIG. 14 is a view showing a circuit including the secondary battery and an AC generation device.

The foregoing secondary battery and an AC generation device are connected to each other as in FIG. 14. The AC generation device includes a parallel circuit. In the parallel circuit, a first A circuit and a second A circuit are connected to each other in parallel with respect to the secondary battery 40. The first A circuit is a circuit in which a capacitor C1 and a switch S1 are connected to each other in series. The second A circuit is a circuit in which a switch S2 and a capacitor C2 are connected to each other in series. Moreover, in the parallel circuit, a contact point P1A and a contact point P2A are connected to each other, and a switch S3 is connected to a portion therebetween. The contact point P1A is a contact point provided between the capacitor C1 and the switch S1 in the first A circuit. The contact point P2A is a contact point provided between the switch S2 and the capacitor C2 in the second A circuit. "G" in the diagram indicates a control signal applied to the switch.

Figure 16:
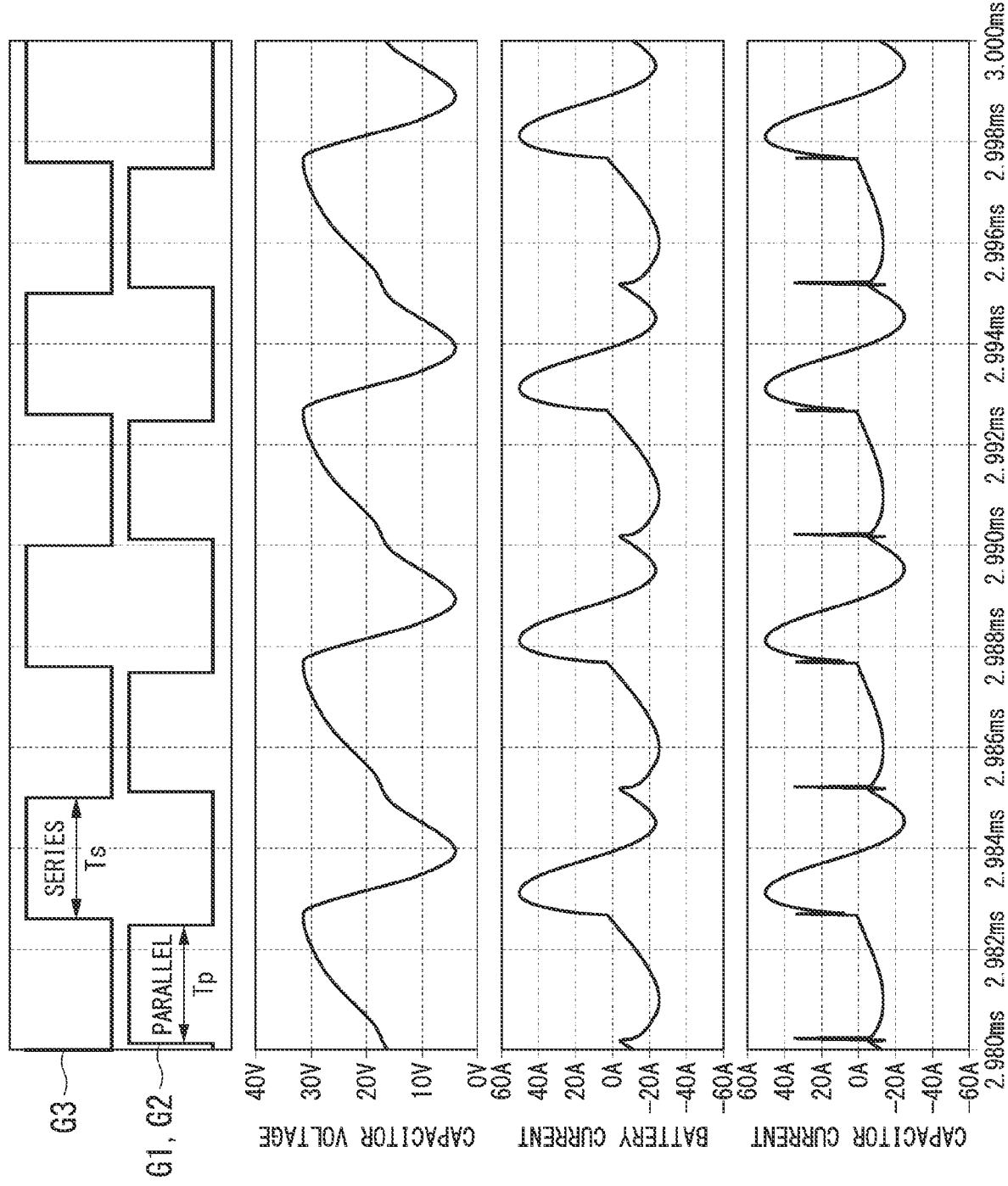
FIG. 16 is a view showing waveforms of constituents when switching between a series state and a parallel state is repeated.

In FIG. 14, a protection circuit for surge absorption and the like are omitted. Waveforms of constituents when switching between a series state and a parallel state is repeated while each of the electrostatic capacities of the two capacitors C1 and C2 is 1.5 μF are shown in FIG. 16, which will be described below. The battery has a voltage of approximately 26 V.

The control unit 106 of the control device 100 controls the switch S3 to be in a conduction state and controls the switch S1 and the switch S2 to be in a shut-off state such that the capacitor C1 and the capacitor C2 are connected to each other in series at the time of charging, and controls the switch S1 and the switch S2 to be in a conduction state and controls the switch S3 to be in a shut-off state at the time of discharging such that the secondary battery 40, the capacitor C1, and the capacitor C2 are connected to each other in parallel.

Figure 15:
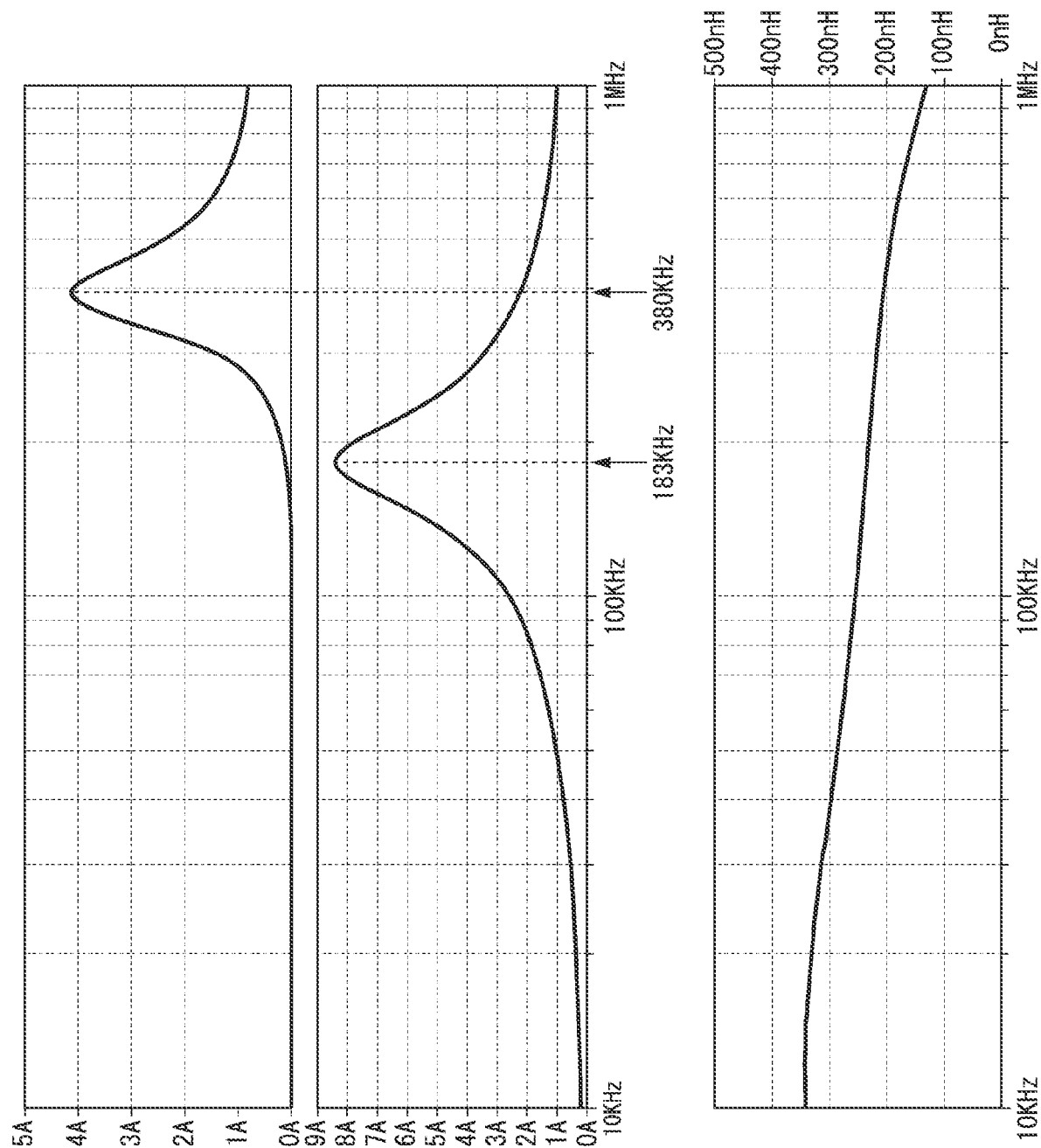
FIG. 15 is a view showing an amplitude of a circulating alternating current and frequency characteristics when a secondary battery and a capacitor having the characteristics described in FIG. 12 are connected to each other in series and an AC voltage of 1 V is applied thereto.

FIG. 15 is a view showing an amplitude of a circulating alternating current and frequency characteristics when a secondary battery and a capacitor having the characteristics described in FIG. 12 are connected to each other in series and an AC voltage of 1 V is applied thereto. As shown in the upper diagram of FIG. 15, the resonance frequency is 380 kHz when two capacitors of 1.5 μF are provided in series and are connected to the secondary battery as capacitors corresponding to 0.75 μF. As shown in the middle diagram of FIG. 15, the resonance frequency is 183 kHz when capacitors of 1.5 μF are provided in parallel and are connected to the secondary battery as capacitors corresponding to 3.0 μF. As shown in the lower diagram of FIG. 15, since the inductance component of the secondary battery varies due to the frequency, the resonance frequency when the capacitors are connected to the secondary battery in series does not coincide with a frequency twice the resonance frequency when the capacitors are connected to the secondary battery in parallel. This secondary battery has characteristics in which an inductance value decreases when the frequency increases. Therefore, the resonance frequency when the capacitors are connected to the secondary battery in parallel is shifted to a higher frequency side than a frequency twice (183×2=366 kHz) when the capacitors are connected to the secondary battery in series. The inductance component of the battery in FIG. 15 is calculated by dividing the value of "d #" in FIG. 12 described above by ω (=2πf) (Z(L)=jωL).

A control signal G3 shown in FIG. 14 described above is a control signal with respect to the switch S3. A control signal G1 and a control signal G2 are the same signals, which are control signals for the switch S1 and the switch S2, respectively. FIG. 16 shows a voltage between the terminals of the capacitor C1 and the capacitor C2, a battery current flowing in the secondary battery (positive, charging the secondary battery), and a capacitor current flowing in each of the capacitor C1 and the capacitor C2 (positive, discharged from the capacitors). The battery current and the capacitor current coincide with each other in a series period and have a relationship of battery current: capacitor current=2:1 in a parallel period.

The switching frequency fsw is 200 kHz, and the switching duty Dsw is 50%. From the waveform of the capacitor current, it can be seen that a vibration cycle of a current due to resonance differs between the series period and the parallel period. An effective value of the battery current is 24.1 A.

Figure 17:
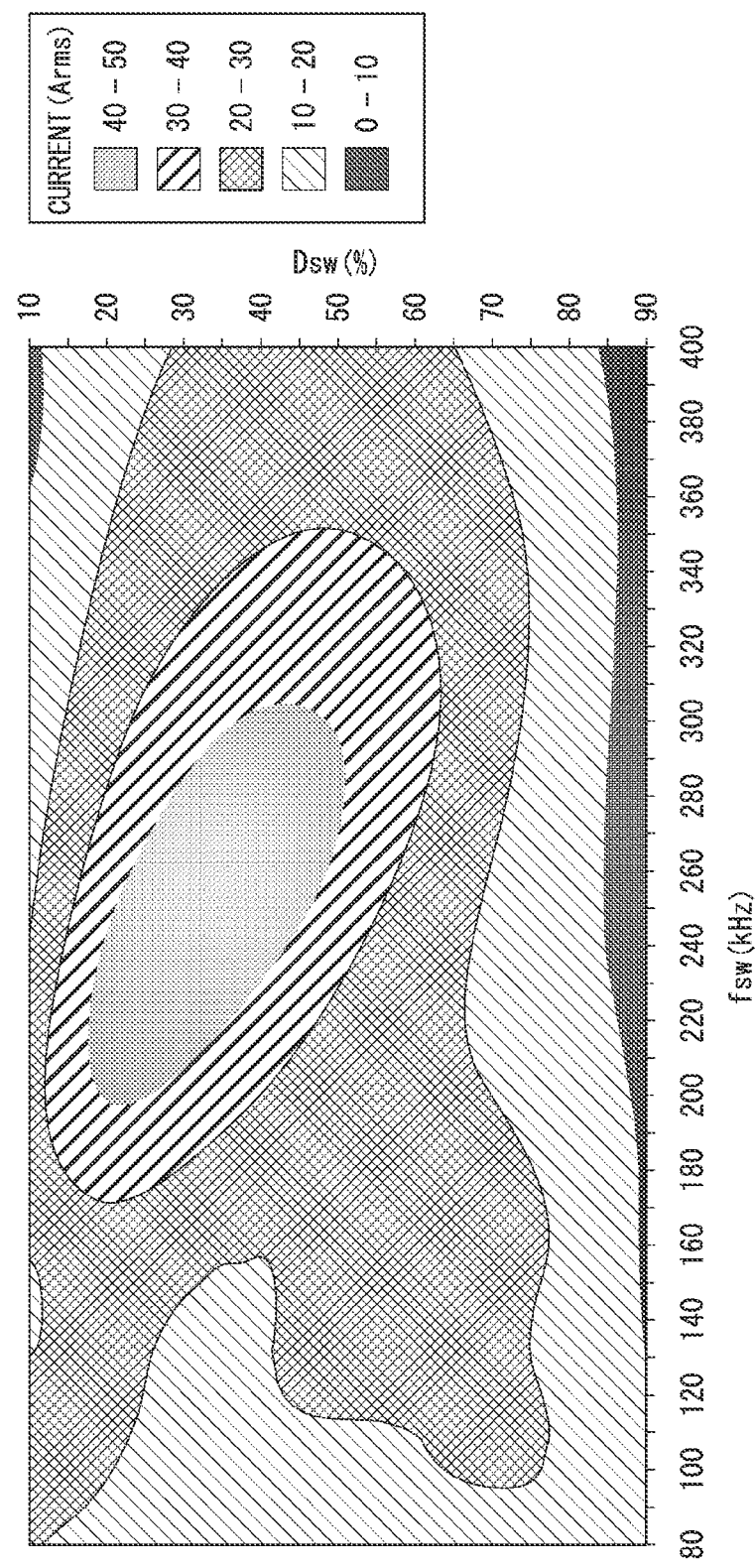
FIG. 17 is a view showing a distribution pattern of a current (effective value) flowing in a battery when series/parallel switching is performed.

FIG. 17 shows a distribution pattern of a current (effective value) flowing in the battery when series/parallel switching is performed by varying the fsw and the Dsw using the battery and the AC generation device described above. The current is 24.1 A under a condition of 200 kHz/50%, but a higher current can flow in areas of fsw=220 kHz to 280 kHz and Dsw=25% to 45%.

Figure 18:
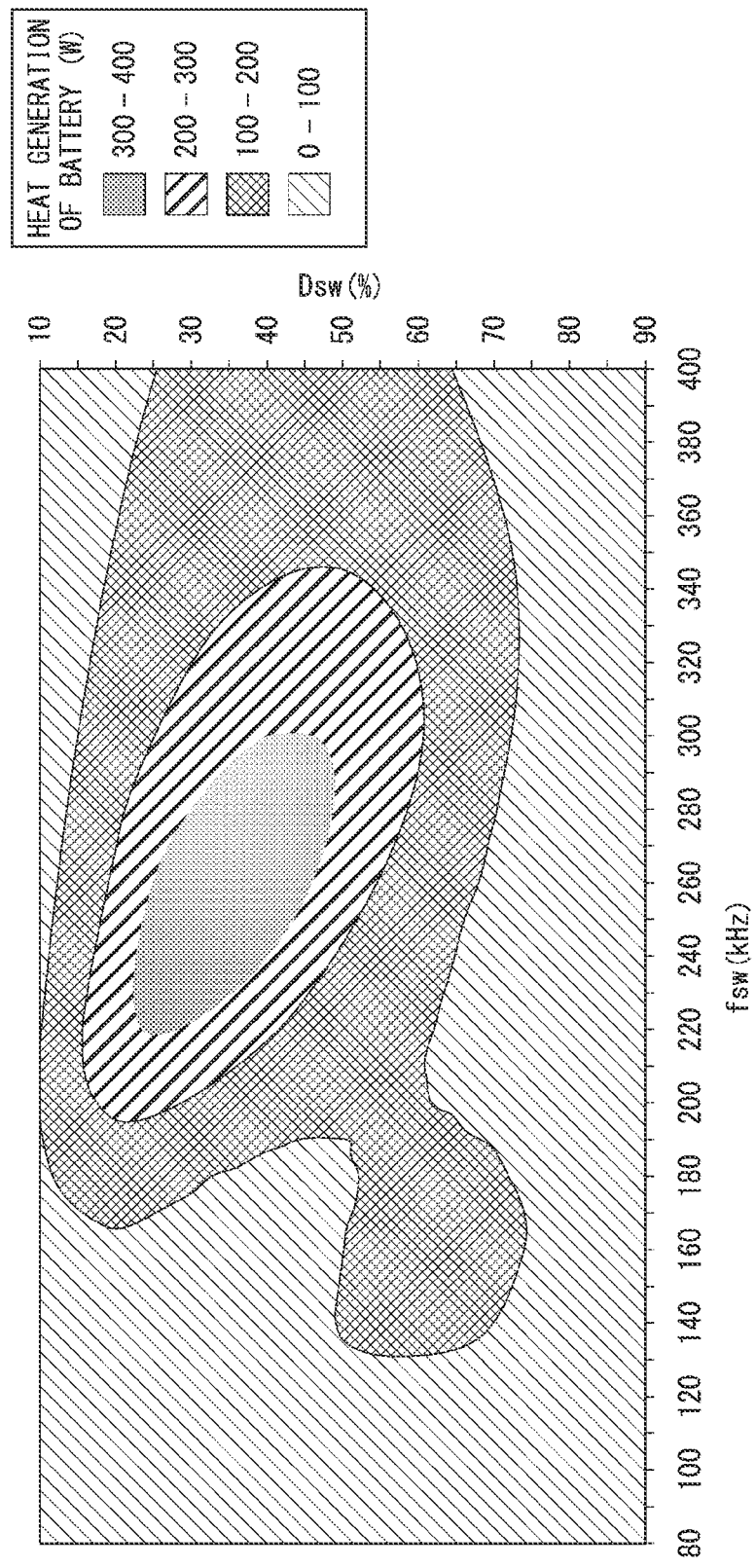
FIG. 18 is a view showing a heat generation quantity generated in the battery.

Similarly, FIG. 18 shows a heat generation quantity generated in the battery. A domain of a high current and a domain of high heat generation substantially coincide with each other.

Figure 19:
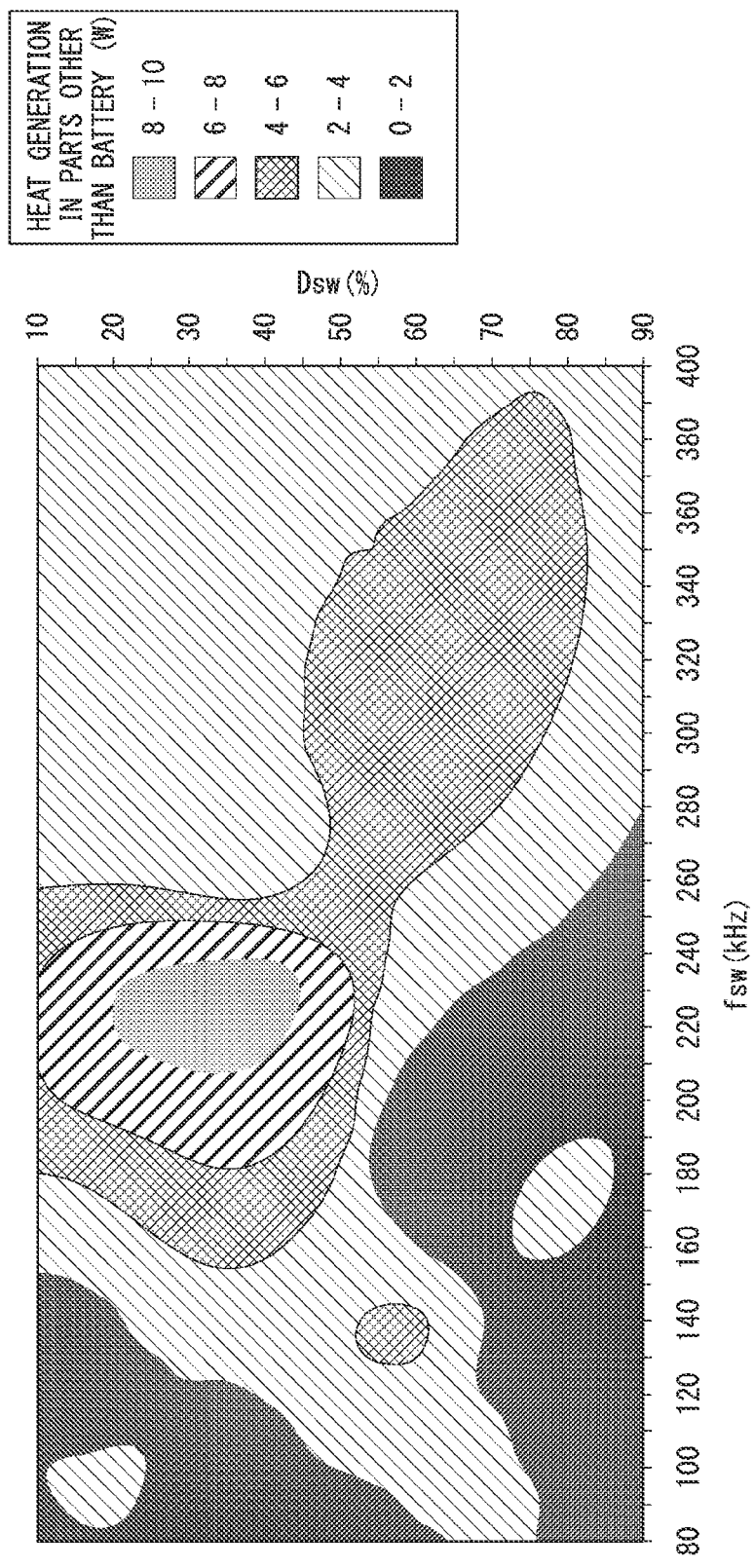
FIG. 19 is a view showing heat generation quantities generated in parts other than the battery.

Similarly, FIG. 19 shows heat generation quantities generated in parts other than the battery (that is, a heat generation loss in the AC generation device). Areas having a large heat generation quantity are locally present (for example, areas of 220 kHz to 230 kHz and 25% to 40%). This heat generation mainly occurs in the switching elements.

Figure 20:
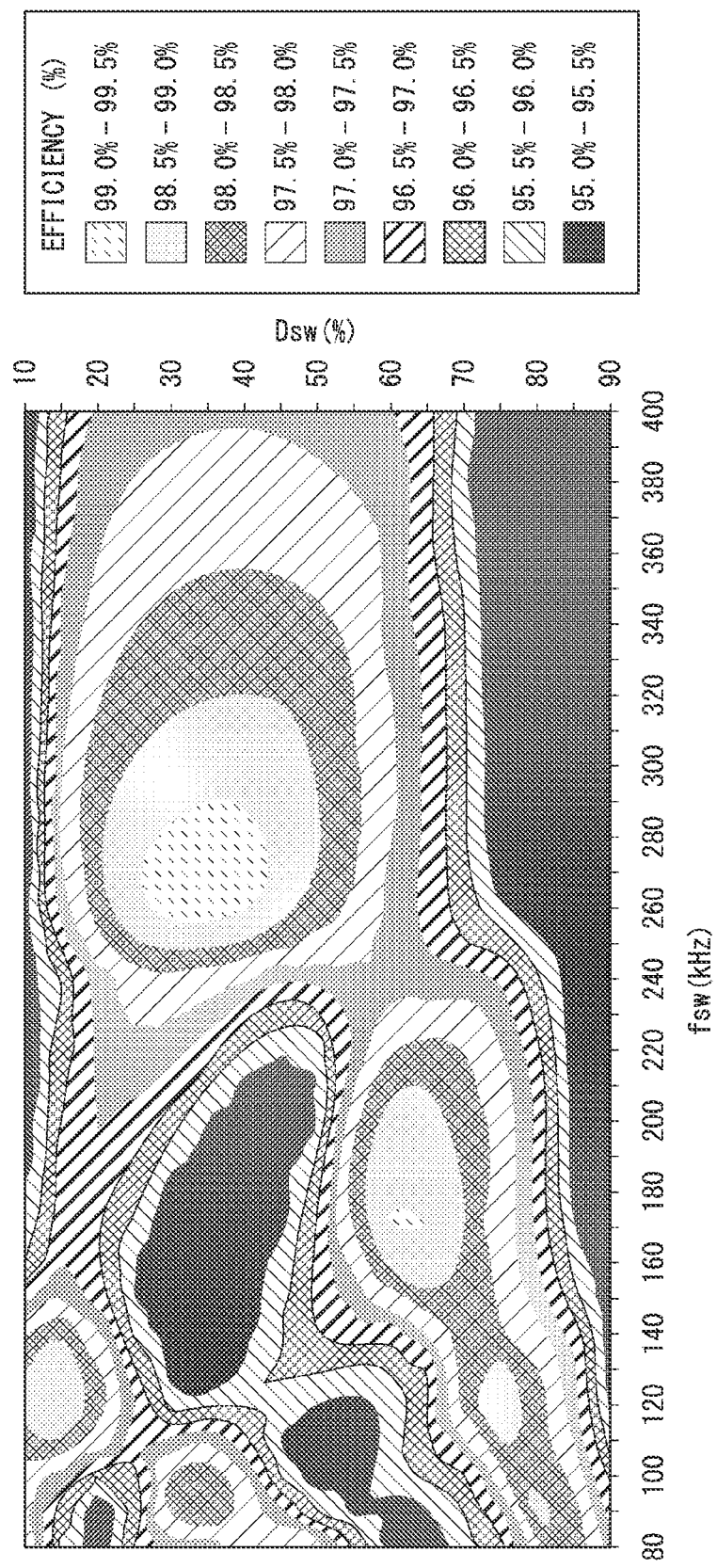
FIG. 20 is a view showing a proportion of the heat generation quantity of the battery with respect to the entire heat generation quantity as efficiency.
Figure 21:
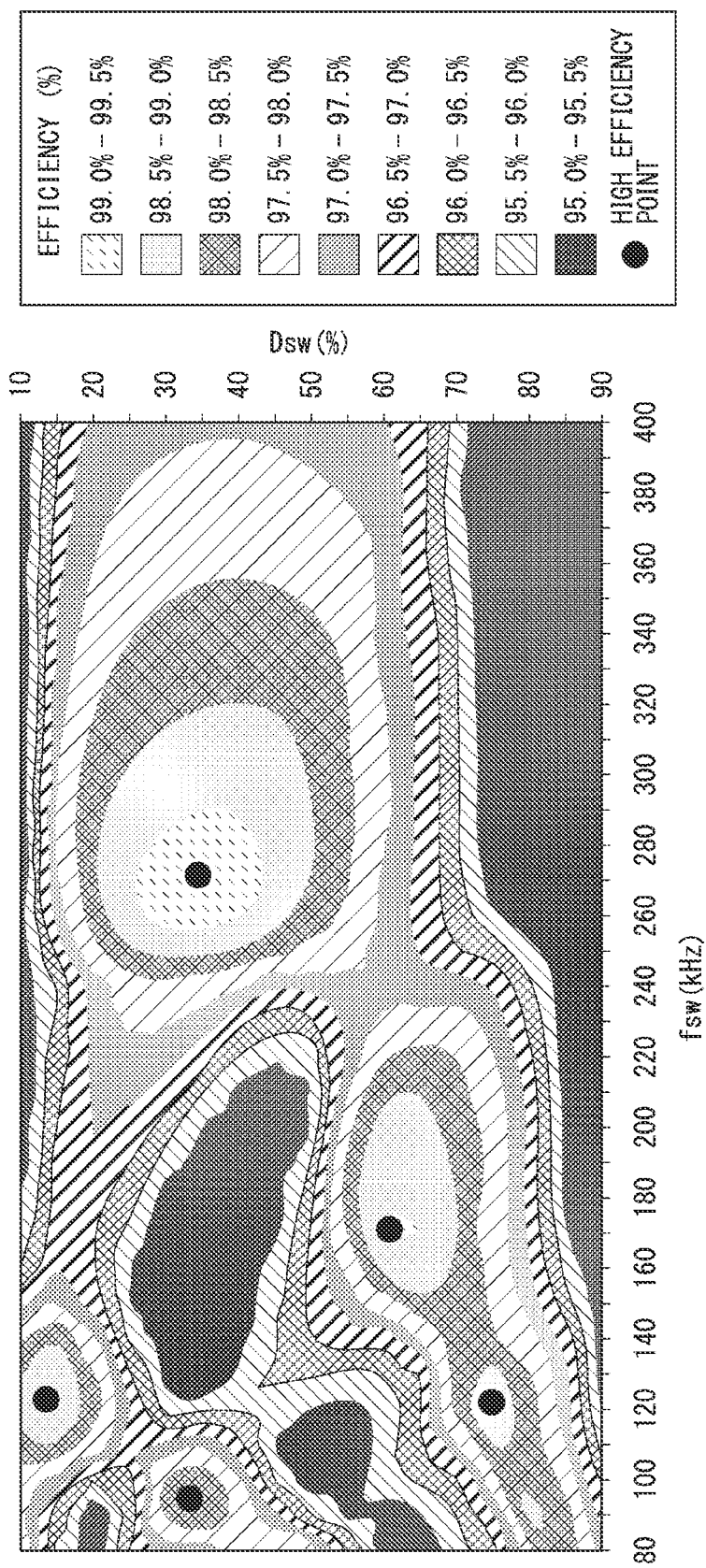
FIG. 21 is a view showing high efficiency points.

FIG. 20 shows the proportion of the heat generation quantity of the battery with respect to the entire heat generation quantity (the entirety including the battery, the switching elements, and the like) as efficiency. Domains having favorable efficiency are distributed at several places in island shapes, and the efficiency is maximized in the vicinity of 270 kHz/35%. Furthermore, as shown at the high efficiency points in FIG. 21, there is a tendency for high efficiency in the vicinity of 170 kHz/60%, 120 kHz/15%, 120 kHz/75%, and 100 kHz/35%.

Figure 22:
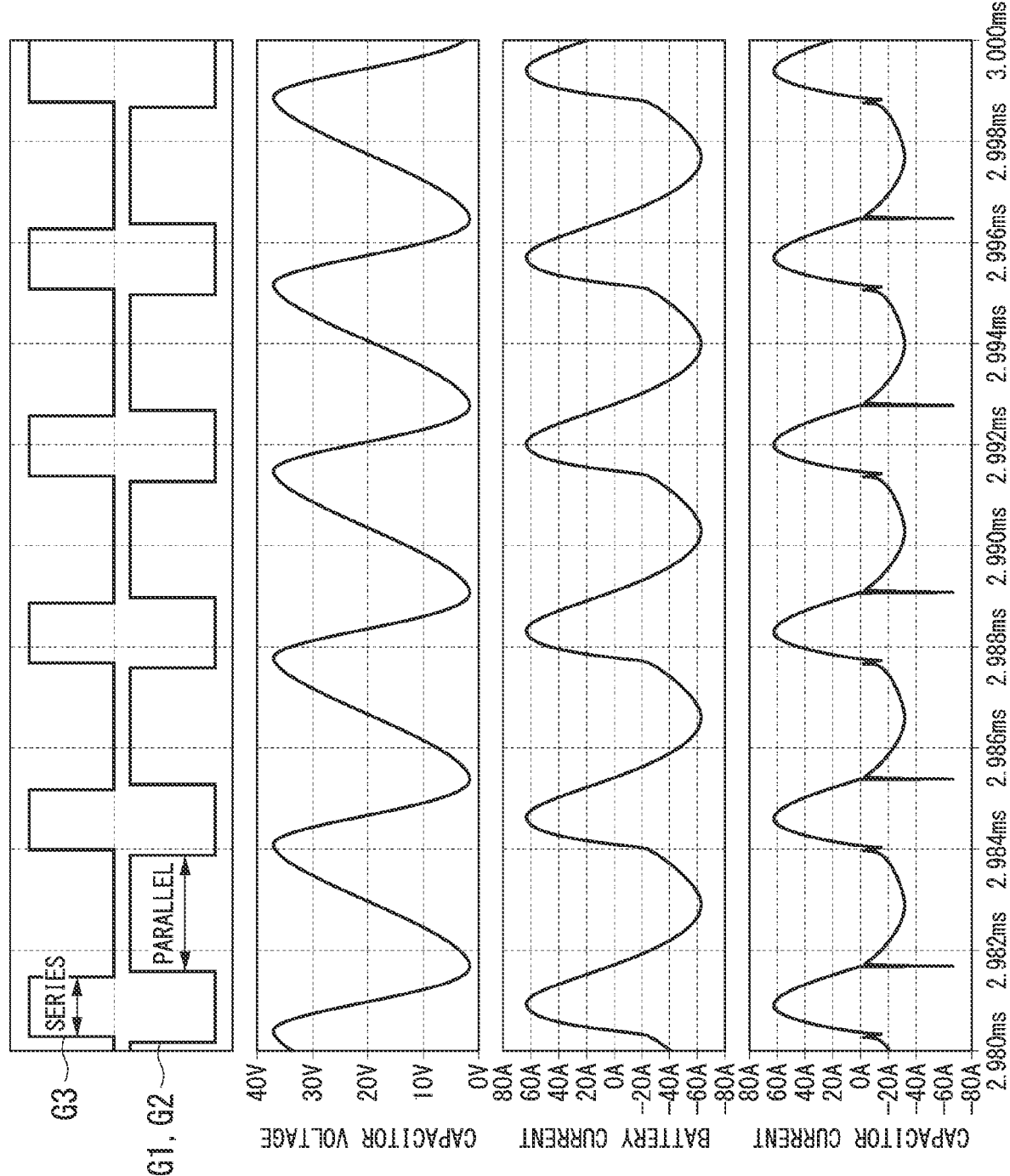
FIG. 22 is a view showing waveforms of currents and a voltage at 270 kHz/35%.

FIG. 22 shows waveforms of currents and a voltage at 270 kHz/35% which is the most efficient condition. The series/parallel state is switched at a timing when the capacitor current is near zero or zero, and zero current switching (ZCS) operation is performed. A loss in the switching elements is reduced, and high efficiency can be achieved.

When a half-cycle time of current vibration in a series state is Tshw and a half-cycle time of current vibration in a parallel state is Tphw, a relationship between the on-time of the switch and the half-cycle time of current vibration due to resonance is approximately Ts=Tshw in a series state and Tp=Tphw in a parallel state.

Figure 23:
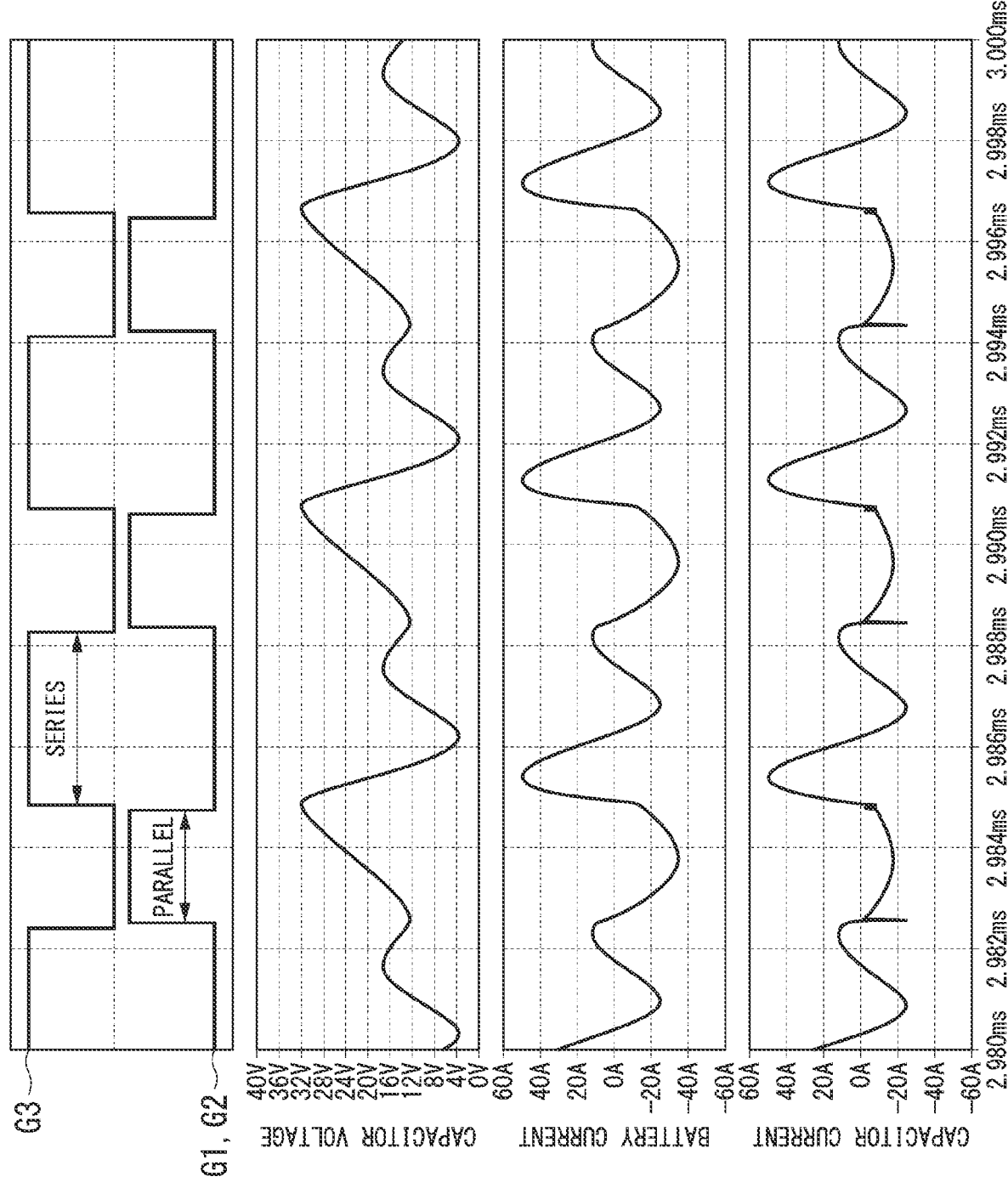
FIG. 23 is a view showing waveforms of currents and a voltage at 170 kHz/60%.

Next, FIG. 23 shows waveforms of currents and a voltage at 170 kHz/60%. When the capacitor current is compared to that in FIG. 22, the waveforms in the parallel period are waveforms similar to each other, but the time is lengthened in the series period by approximately three times, and vibration of a current waveform of approximately one and half cycles can be seen.

The relationship between the on-time of the switch and the half-cycle time of current vibration due to resonance is approximately Ts=3Tshw in a series state and Tp=Tphw in a parallel state.

Figure 24:
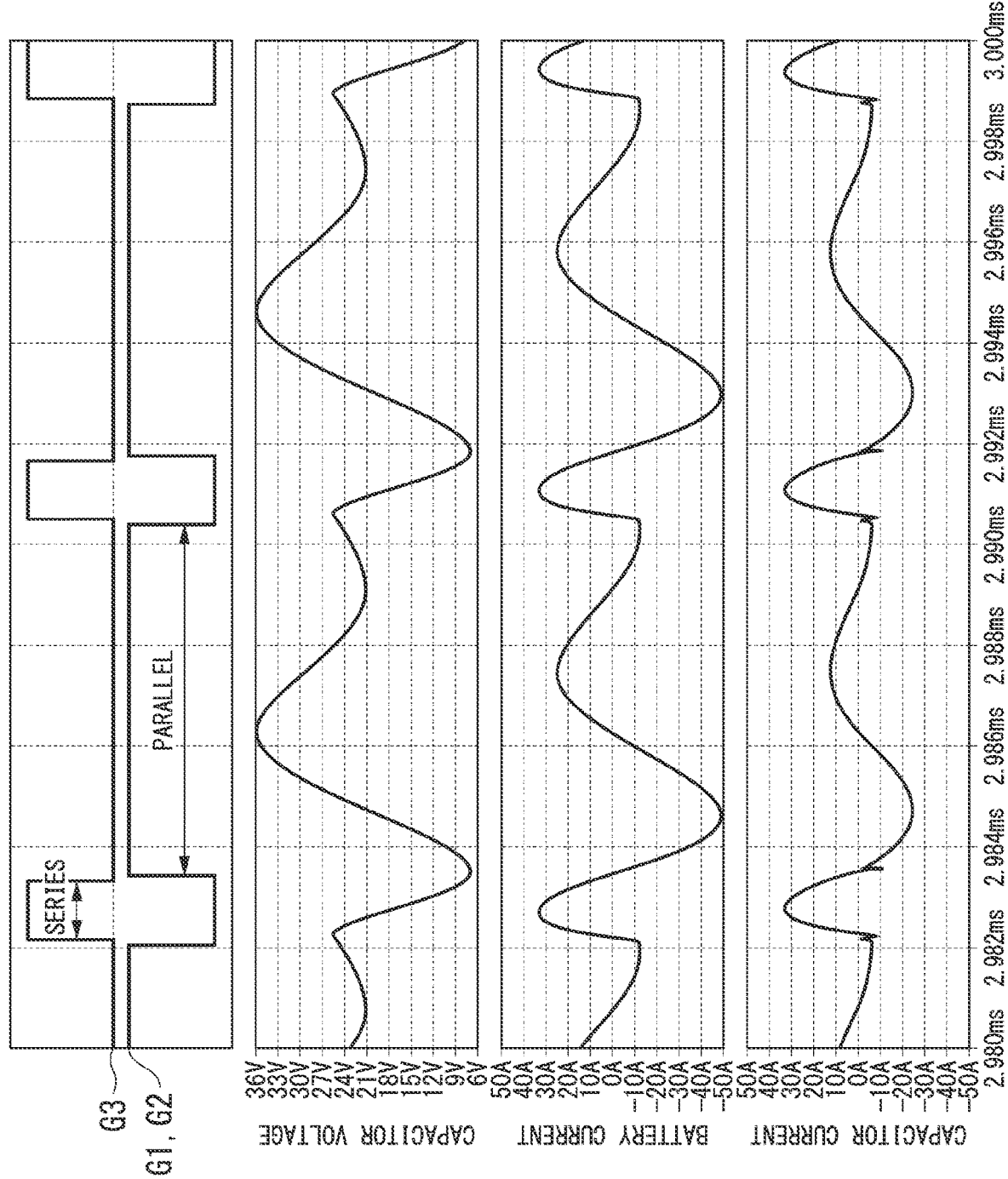
FIG. 24 is a view showing waveforms of currents and a voltage at 120 kHz/15%.

Next, FIG. 24 shows waveforms of currents and a voltage at 120 kHz/15%. When the capacitor current is compared to that in FIG. 22, the waveforms in the series period are waveforms similar to each other, but the time is lengthened in the parallel period by approximately three times, and vibration of a current waveform of approximately one and half cycles can be seen.

The relationship between the on-time of the switch and the half-cycle time of current vibration due to resonance is approximately Ts=Tshw in a series state and Tp=3Tphw in a parallel state.

Figure 25:
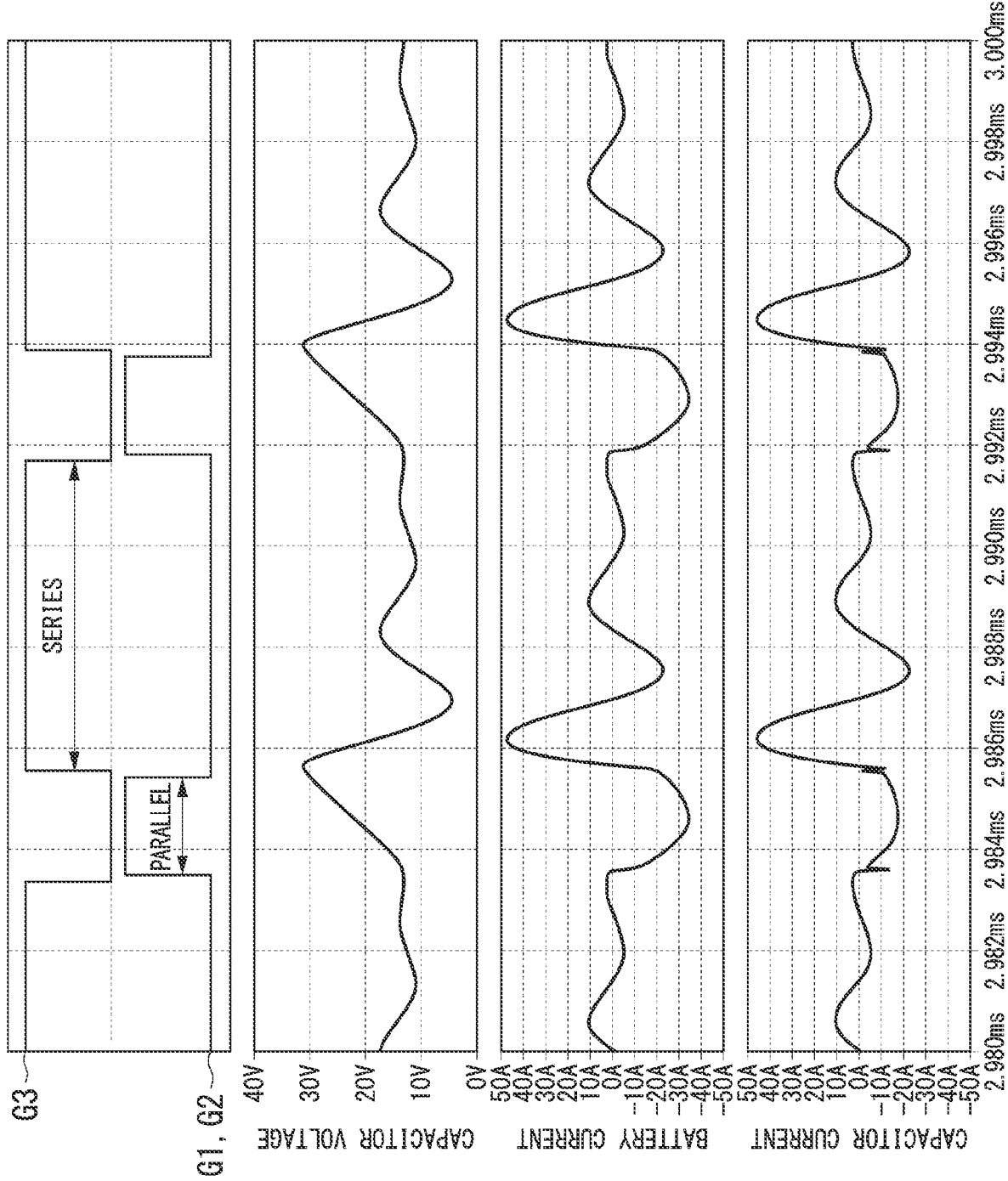
FIG. 25 is a view showing waveforms of currents and a voltage at 120 kHz/75%.

Next, FIG. 25 shows waveforms of currents and a voltage at 120 kHz/75%. When the capacitor current is compared to that in FIG. 22, the waveforms in the parallel period are waveforms similar to each other, but the time is lengthened in the series period by approximately five times, and vibration of a current waveform of approximately two and half cycles can be seen.

A relationship between the on-time of the switch and the half-cycle time of current vibration due to resonance is approximately Ts=5Tshw in a series state and Tp=Tphw in a parallel state.

Figure 26:
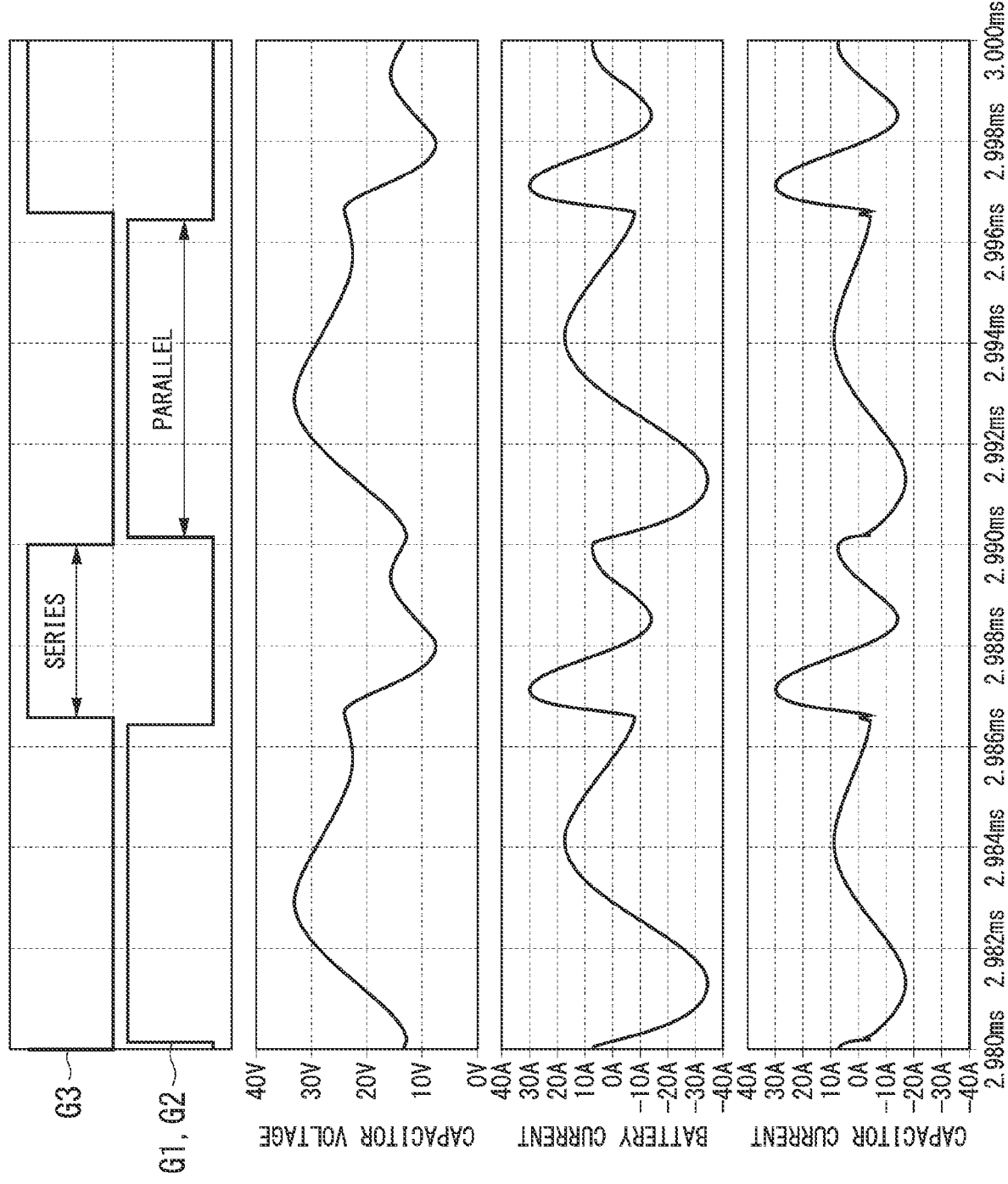
FIG. 26 is a view showing waveforms of currents and a voltage at 100 kHz/35%.

Next, FIG. 26 shows waveforms of currents and a voltage at 100 kHz/35%. When the capacitor current is compared to that in FIG. 22, the time is lengthened in each of the series period and the parallel period by approximately three times, and vibration of each current waveform of approximately one and half cycles can be seen.

A relationship between the on-time of the switch and the half-cycle time of current vibration due to resonance is approximately Ts=3Tshw in a series state and Tp=3Tphw in a parallel state.

As described above, the control device 100 can perform heat generation of the battery with higher efficiency by performing controlling such that the half-cycle time of current vibration in a series state (Tshw) is an odd number of times (odd multiple) including one time (for example, one time, three times, or five times) and the half-cycle time of current vibration in a parallel state (Tphw) is an odd number of times including one time (for example, one time or three times).

In other words, the control device 100 can perform heat generation of the battery with higher efficiency by performing operation at a switching frequency and a switching duty to shift to the parallel circuit through control of the switch at a timing when a current flowing in the capacitors C1 and C2 straddles zero due to resonance of the series circuit and to shift to the series circuit through control of the switch at a timing when a current flowing in the capacitor C1 and the capacitor C2 straddles zero due to resonance of the parallel circuit.

Figure 27:
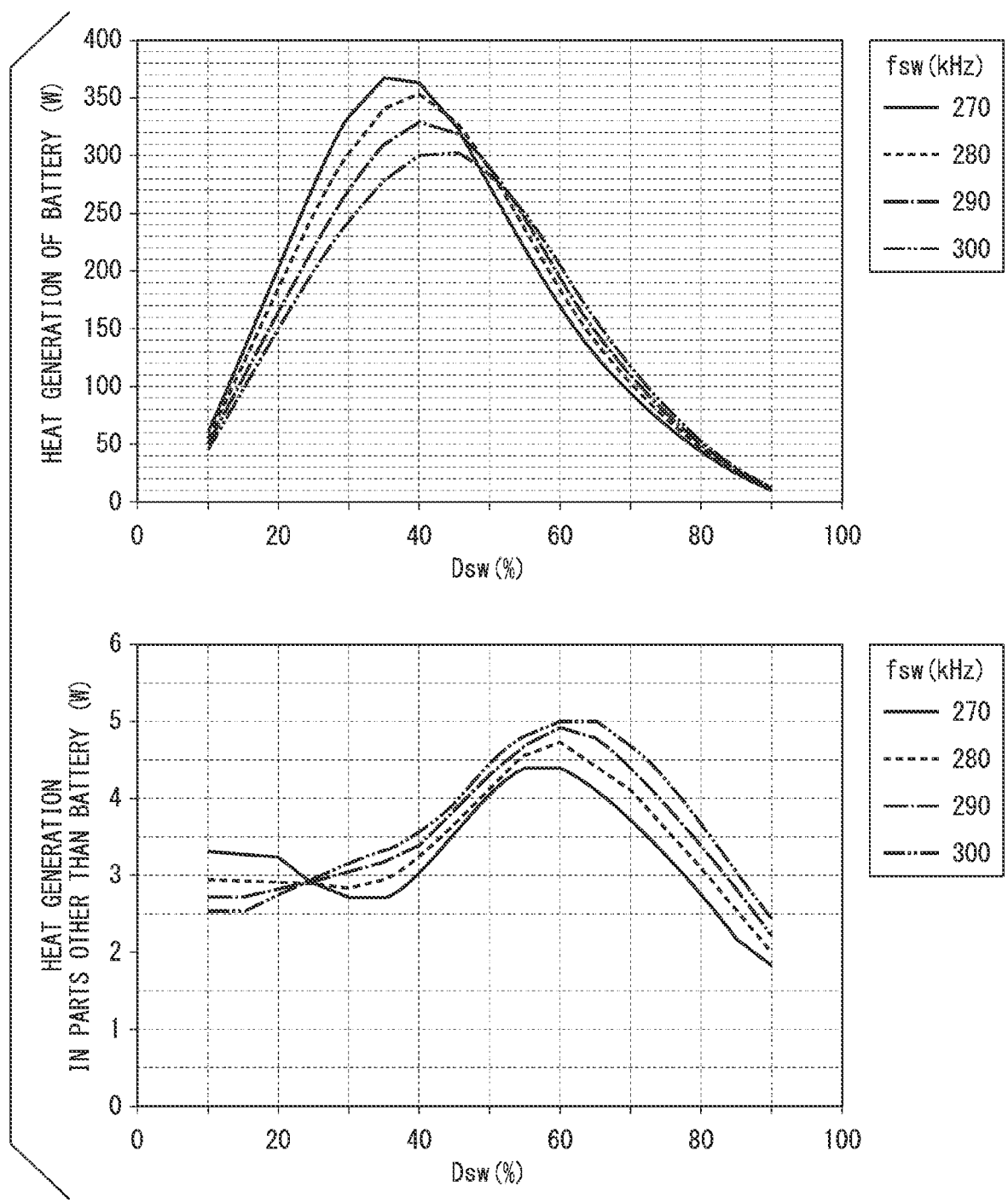
FIG. 27 is a view showing relationships between switching duties and heat generation quantities.

When the heat generation quantity of the battery is excessive and it is desired to curb this, for example, as shown in FIG. 27, the heat generation quantity of the battery can be reduced without significantly increasing heat generation (=a loss in the AC generation device) in portions other than the battery by adjusting it in a direction in which the Dsw is reduced from 270 kHz/35% that is the highest heat generation point. Moreover, in a domain in which the Dsw is equal to or smaller than 25%, heat generation in portions other than the battery can be reduced by performing adjustment to fsw=300 kHz.

As described above, it is possible to adjust the quantity of an alternating current flowing in the battery, the heat generation quantity of the battery, and the heat generation loss of the AC generation device by adjusting the switching frequency fsw and the switching duty Dsw. Particularly, in both the series period and the parallel period, under a condition in which the on-time of the switch is close to an odd number of times (including one time) the half-cycle time of current vibration due to resonance, a heat generation loss in the AC generation device can be reduced, and heat generation of the battery can be performed with high efficiency.

[Hardware Constitution]

Figure 28:
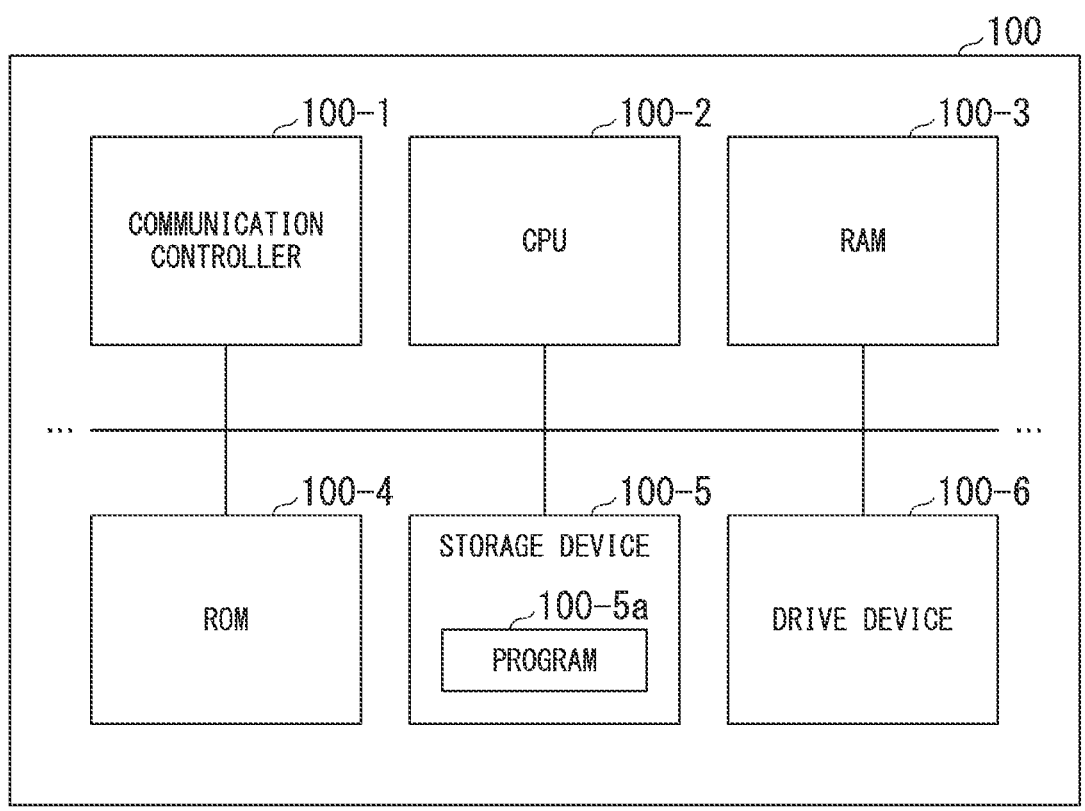
FIG. 28 is a view showing an example of a hardware constitution of the control device of the embodiment.

FIG. 28 is a view showing an example of a hardware constitution of the control device 100 of the embodiment. As shown in the diagram, the control device 100 has a constitution in which a communication controller 100-1, a CPU 100-2, a random access memory (RAM) 100-3 used as a working memory, a read only memory (ROM) 100-4 storing a booting program and the like, a storage device 100-5 such as a flash memory or a hard disk drive (HDD), a drive device 100-6, and the like are connected to each other through an internal bus or a dedicated communication line. The communication controller 100-1 communicates with constituent elements other than the control device 100. The storage device 100-5 stores a program 100-5a executed by the CPU 100-2. This program is developed in the RAM 100-3 by a direct memory access (DMA) controller (not shown) or the like and is executed by the CPU 100-2. Accordingly, some or all of the information management unit 102, the information processing unit 104, and the control unit 106 are realized.

Hereinabove, forms for carrying out the present invention have been described using the embodiments, but the present invention is not limited to these embodiments at all, and various modifications and substitutions can be applied within a range not departing from the gist of the present invention.

What is claimed is:

1. A temperature raising device comprising:
an AC generation circuit that includes a first circuit, a second circuit, and a third circuit,
   the first circuit comprising a first capacitor and a first switch connected to each other in series, the second circuit comprising a second switch and a second capacitor connected to each other in series, and the third circuit comprising a third switch, wherein the third switch is connected at a first end to the first circuit at a contact point between the first capacitor and the first switch and at a second end to the second circuit at a contact point between the second capacitor and the second switch,
   the second circuit being connected to the first circuit in parallel; and a control device comprising a processor and a memory that stores executable instructions that, when executed by the processor, facilitate performance of operations, wherein the operations comprise:
   controlling the first switch to be in a conduction state or to be in a shut-off state, the second switch to be in a conduction state or to be in a shut-off state, and the third switch to be in a conduction state or to be in a shut-off state,
   wherein the controlling comprises:
      connecting the first capacitor to the second capacitor in series based on controlling the first switch to be in a shut-off state, the second switch to be in a shut-off state, and the third switch to be in a conduction state, and
      executing a first control for supplying electricity from the first capacitor and the second capacitor to a secondary battery connected to the first circuit and the second circuit, and
   wherein the operations further comprise:
      controlling the first switch to be in a conduction state, the second switch to be in a conduction state, and the third switch to be in a shut-off state, and
      executing a second control for supplying electricity from the secondary battery to the first capacitor and the second capacitor.

2. The temperature raising device according to claim 1, wherein a switching frequency at which the first control and the second control are switched is a frequency between a resonance frequency of a series circuit and a resonance frequency of a parallel circuit, the series circuit being formed when the first switch and the second switch are in a shut-off state and the third switch is in a conduction state, the parallel circuit being formed when the first switch and the second switch are in a conduction state and the third switch is in a shut-off state,
wherein the series circuit is a circuit in which the secondary battery, the first capacitor, the third switch, and the second capacitor are connected to each other in series, and
wherein the parallel circuit is a circuit in which the secondary battery, a circuit having the first capacitor and the first switch connected to each other in series, and a circuit having the second capacitor and the second switch connected to each other in series are connected to each other in parallel.

3. The temperature raising device according to claim 1, wherein the temperature raising device is configured to be operated at a switching frequency and a switching duty in which a period of the first control is half a resonance cycle or an odd multiple of the half a resonance cycle of a series circuit formed when the first switch and the second switch are in a shut-off state and the third switch is in a conduction state and a period of the second control is half a resonance cycle or an odd multiple of the half a resonance cycle of a parallel circuit formed when the first switch and the second switch are in a conduction state and the third switch is in a shut-off state,
wherein the series circuit is a circuit in which the secondary battery, the first capacitor, the third switch, and the second capacitor are connected to each other in series, and
wherein the parallel circuit is a circuit in which the secondary battery, a circuit having the first capacitor and the first switch connected to each other in series, and a circuit having the second capacitor and the second switch connected to each other in series are connected to each other in parallel.

4. The temperature raising device according to claim 1, wherein the temperature raising device is configured to be operated at a switching frequency and a switching duty while shifting from a state of the first control to the second control when a current flowing in the first capacitor and the second capacitor straddles zero due to resonance of a series circuit and shifting from a state of the second control to the first control when a current flowing in the first capacitor and the second capacitor straddles zero due to resonance of a parallel circuit, the series circuit being formed when the first switch and the second switch are in a shut-off state and the third switch is in a conduction state, the parallel circuit being formed when the first switch and the second switch are in a conduction state and the third switch is in a shut-off state,
wherein the series circuit is a circuit in which the secondary battery, the first capacitor, the third switch, and the second capacitor are connected to each other in series, and
wherein the parallel circuit is a circuit in which the secondary battery, a circuit having the first capacitor and the first switch connected to each other in series, and a circuit having the second capacitor and the second switch connected to each other in series are connected to each other in parallel.

5. The temperature raising device according to claim 1, wherein a heat generation quantity of the secondary battery and a heat generation loss quantity of the AC generation circuit are regulated by adjusting a switching frequency at which the first control and the second control are switched between and a switching duty.

* * * * *